US012786765B2

(12) United States Patent
Matsumoto et al.

(10) Patent No.: US 12,786,765 B2
(45) Date of Patent: Nov. 3, 2026

(54) COMMUNICATION SYSTEM AND METHOD FOR THE SAME

(71) Applicant: DENSO CORPORATION, Kariya-city (JP)

(72) Inventors: Sho Matsumoto, Kariya-city (JP); Youichi Hayase, Kariya-city (JP); Tomohisa Kishigami, Kariya-city (JP); Yuto Honda, Kariya-city (JP); Ryu Atsuta, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 705 days.

(21) Appl. No.: 18/322,112

(22) Filed: May 23, 2023

(65) Prior Publication Data

US 2023/0388833 A1 Nov. 30, 2023

(30) Foreign Application Priority Data

May 26, 2022 (JP) ................................ 2022-086239

(51) Int. Cl.
*H04W 24/08* (2009.01)

(52) U.S. Cl.
CPC .................................. *H04W 24/08* (2013.01)

(58) Field of Classification Search
CPC .................................................... H04W 24/08
See application file for complete search history.

(56) References Cited

U.S. PATENT DOCUMENTS

| | | | | |
|---|---|---|---|---|
| 9,722,899 | B2 * | 8/2017 | Nagata | H04B 17/336 |
| 11,411,407 | B1 * | 8/2022 | Tenorio | H01M 10/0525 |
| 2006/0056492 | A1 * | 3/2006 | Honda | H04B 1/715 375/132 |
| 2014/0140634 | A1 * | 5/2014 | Hayashida | A61B 6/548 250/336.1 |
| 2021/0368364 | A1 * | 11/2021 | Otsuki | H04B 17/309 |
| 2021/0408817 | A1 * | 12/2021 | Dan | G01R 31/3842 |

FOREIGN PATENT DOCUMENTS

| | | | | |
|---|---|---|---|---|
| EP | 3742414 | B1 * | 9/2023 | G08B 25/007 |
| JP | 2015-037304 | A | 2/2015 | |
| JP | 6403522 | B2 | 10/2018 | |

OTHER PUBLICATIONS

U.S. Appl. No. 18/321,931, filed May 23, 2023, Matsumoto et al.

* cited by examiner

*Primary Examiner* — Abdeltif Ajid
(74) *Attorney, Agent, or Firm* — Posz Law Group, PLC

(57) ABSTRACT

A communication system includes a master communication device and a plurality of slave communication devices. The master communication device obtains, for each of the plurality of slave communication devices, multiple communication characteristics during wireless communication. The communication system further includes a storage unit storing multiple reference communication characteristics. The system determines an abnormality in wireless communication between the at least one master communication device and each of the plurality of slave communication devices based on strength of correlation between (a) an overall trend of the obtained multiple communication characteristics and (b) an overall trend of the multiple reference communication characteristics stored in the storage unit.

16 Claims, 12 Drawing Sheets

FIG. 6

| | S1 | S2 | S3 | S4 | S5 |
|---|---|---|---|---|---|
| T=1 | ○ | × | ○ | ○ | ○ |
| T=2 | ○ | × | ○ | ○ | ○ |
| T=3 | ○ | × | ○ | ○ | ○ |
| ⋮ | ○ | × | ○ | ○ | ○ |

FIG. 9
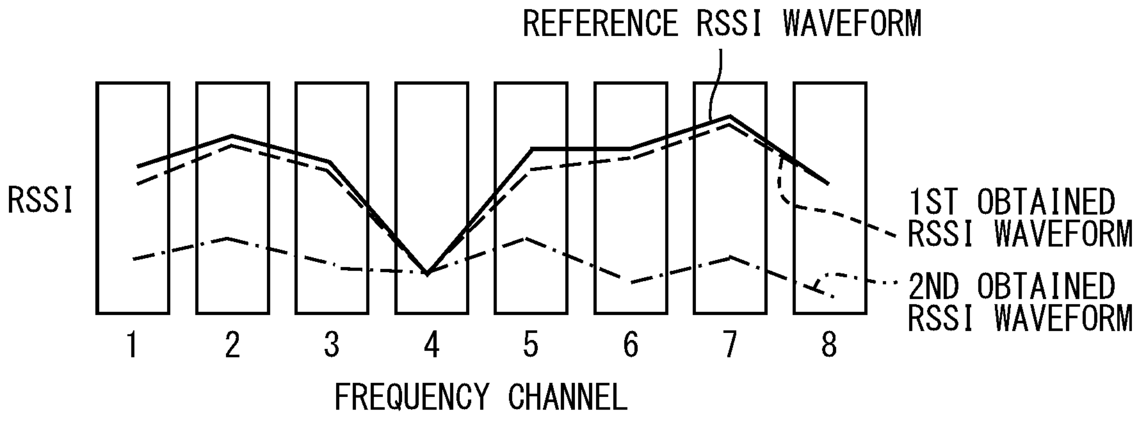
FIG. 10
| | S1 | S2 | S3 | S4 | S5 |
|---|---|---|---|---|---|
| M1 | ○ | ○ | ○ | ○ | ○ |
| M2 | ○ | ○ | ○ | ○ | ○ |
FIG. 11
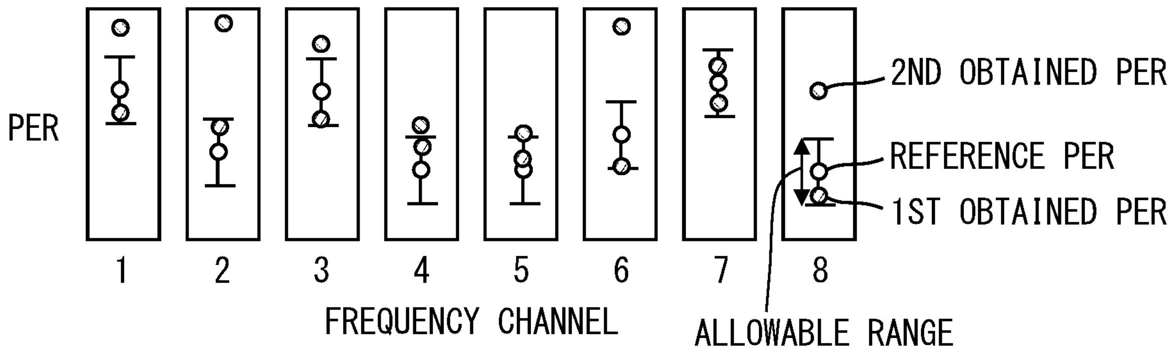

FIG. 14

| | S1 | S2 | S3 | S4 | S5 |
|---|---|---|---|---|---|
| M1 | × | × | × | × | × |
| M2 | ○ | ○ | ○ | ○ | ○ |

FIG. 15

| | S1 | S2 | S3 | S4 | S5 |
|---|---|---|---|---|---|
| M1 | × | ○ | ○ | ○ | ○ |
| M2 | × | ○ | ○ | ○ | ○ |

FIG. 16

| | S1 | S2 | S3 | S4 | S5 |
|---|---|---|---|---|---|
| M1 | × | × | × | × | × |
| M2 | × | × | × | × | × |

FIG. 17

| | S1 | S2 | S3 | S4 | S5 |
|---|---|---|---|---|---|
| M1 | × | ○ | × | ○ | × |
| M2 | ○ | × | ○ | × | × |

COMMUNICATION SYSTEM AND METHOD FOR THE SAME

CROSS REFERENCE TO RELATED APPLICATION

The present application is based on and claims the benefit of priority of Japanese Patent Application No. 2022-086239, filed on May 26, 2022, the disclosure of which is incorporated herein by reference.

TECHNICAL FIELD

The present disclosure relates to a communication system having at least one master communication device and multiple slave communication devices and a method for the same.

BACKGROUND

For example, a wireless communication device configured to determine failure in a wireless network has been known. The wireless communication device has a failure determination unit. The failure determination unit refers to a packet loss rate table, and identifies wireless communication terminal(s) whose packet loss rate is equal to or higher than a predetermined threshold, and determines that the wireless communication device has a failure.

SUMMARY

In one aspect of the present disclosure, a communication system includes: at least one master communication device and a plurality of slave communication devices. The at least one master communication device and the plurality of slave communication devices are respectively arranged at fixed positions. The at least one master communication device is capable of wirelessly communicating with each of the plurality of slave communication devices on over multiple frequency channels. The at least one master communication device includes: a communication characteristics obtainer obtaining, for each of the plurality of slave communication devices, information indicating multiple communication characteristics related to wireless communication over the multiple frequency channels while performing wireless communication with each of the plurality of slave communication devices. The communication system further comprises: a storage unit storing, for each of the plurality of slave communication devices, multiple reference communication characteristics related to wireless communication over each of the multiple frequency channels, the reference communication characteristics being characteristics that were obtained when the at least one master communication device communicated with each of the plurality of slave communication devices on over the multiple frequency channels; and an abnormality determination unit determining, for each of the plurality of slave communication devices, an abnormality in wireless communication performed therebetween the at least one master communication device and each of the plurality of slave communication devices, for each of the plurality of slave communication devices, based on strength of correlation between: (a) an overall trend of the multiple communication characteristics over across the multiple frequency channels obtained by the communication characteristics obtainer, regarding wireless communication on over the multiple frequency channels between the at least one master communication device and each of the plurality of slave communication devices; and (b) an overall trend of the multiple reference communication characteristics over across the multiple frequency channels, that are stored in the storage unit for each of the plurality of slave communication devices.

BRIEF DESCRIPTION OF THE DRAWINGS

The above and other objects, features and advantages of the present disclosure will become more apparent from the following detailed description made with reference to the accompanying drawings. In the drawings:

FIG. 6 is a diagram showing an example of recorded contents of a communication NG recorder of the master communication device;

FIG. 9 is a diagram showing an example of an overall trend of obtained RSSIs obtained when the master communication device communicates with one slave communication device on multiple frequency channels and an overall trend of reference RSSIs;

FIG. 10 is a diagram showing an example of a determination result of determining an abnormality in wireless communication between the master communication device and each of a plurality of slave communication devices, for each of first and second master communication devices using RSSI;

FIG. 11 is a diagram showing an example of an overall trend of obtained PERs obtained when a master communication device communicates with one slave communication device on multiple frequency channels and an overall trend of reference PERs;

FIG. 14 is a diagram showing an example of an abnormality determination result of wireless communication between (a) the first and second master communication devices and (b) the plurality of slave communication devices when one of the master communication devices is abnormal;

FIG. 15 is a diagram showing an example of an abnormality determination result of wireless communication between (a) the first and second master communication devices and (b) the plurality of slave communication devices when one of the slave communication devices is abnormal;

FIG. 16 is a diagram showing an example of an abnormality determination result of wireless communication between (a) the first and second master communication devices and (b) the plurality of slave communication devices when an abnormality occurs in a communication propagation path; and FIG. 17 is a diagram showing an example of an abnormality determination result of wireless communication between (a) the first and second master communication devices and (b) the plurality of slave communication devices when an abnormality occurrence position cannot be specified.

DETAILED DESCRIPTION

Figure 1:
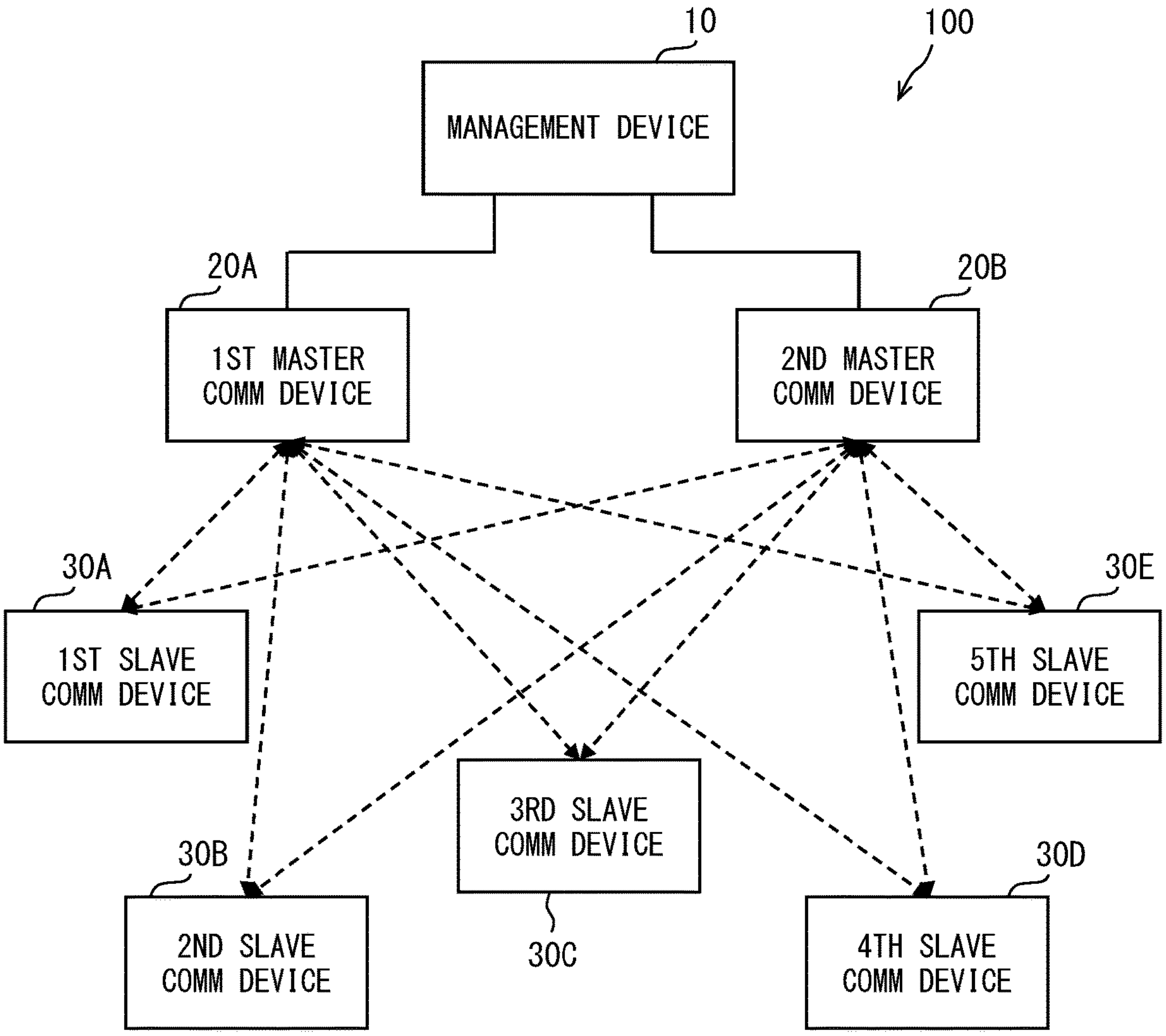
FIG. 1 is a configuration diagram showing an overall configuration of a communication system according to an embodiment.

Next, a relevant technology will be described only for understanding the following embodiment. In a communication system, when all wireless communication terminals have packet loss rates equal to or higher than the threshold, the failure determination unit determines that the wireless communication device has a failure. On the other hand, when the wireless communication terminals whose packet loss rate is equal to or higher than the threshold are part of all wireless communication terminals, the failure determining unit determines that the wireless communication terminal whose packet loss rate is equal to or higher than the threshold has a failure.

Such a wireless communication device determines a failure of the wireless communication device or a failure of the wireless communication terminal based on the packet loss rate in communication between the wireless communication device and the wireless communication terminal.

However, since such determination is simply based on the packet loss rate, even when communication failure occurs due to external factors (for example, interference with external radio waves, etc.), the wireless communication device or wireless communication terminal may mistakenly be determined as having a failure.

It is one objective of the present disclosure to provide a communication system capable of more accurately determining a failure of a communication device.

According to a first aspect of the present disclosure, a communication system includes: at least one master communication device and a plurality of slave communication devices. The at least one master communication device and the plurality of slave communication devices are respectively arranged at fixed positions. The at least one master communication device is capable of wirelessly communicating with each of the plurality of slave communication devices on over multiple frequency channels. The at least one master communication device includes: a communication characteristics obtainer obtaining, for each of the plurality of slave communication devices, information indicating multiple communication characteristics related to wireless communication over the multiple frequency channels while performing wireless communication with each of the plurality of slave communication devices. The communication system further comprises: a storage unit storing, for each of the plurality of slave communication devices, multiple reference communication characteristics related to wireless communication over each of the multiple frequency channels, the reference communication characteristics being characteristics that were obtained when the at least one master communication device communicated with each of the plurality of slave communication devices on over the multiple frequency channels; and an abnormality determination unit determining, for each of the plurality of slave communication devices, an abnormality in wireless communication performed therebetween the at least one master communication device and each of the plurality of slave communication devices, for each of the plurality of slave communication devices, based on strength of a magnitude of correlation between: (a) an overall trend of the multiple communication characteristics over across the multiple frequency channels obtained by the communication characteristics obtainer, regarding wireless communication on over the multiple frequency channels between the at least one master communication device and each of the plurality of slave communication devices; and (b) an overall trend of the multiple reference communication characteristics over across the multiple frequency channels, that are stored in the storage unit for each of the plurality of slave communication devices.

According to a second aspect of the present disclosure, a communication system includes: at least one master communication device and a plurality of slave communication devices. The at least one master communication device and the plurality of slave communication devices are arranged at fixed positions. The at least one master communication device is capable of wirelessly communicating with each of the plurality of slave communication devices over multiple frequency channels. The at least one master communication device includes at least one first processor programmed to obtain, for each of the plurality of slave communication devices, multiple communication characteristics related to wireless communication over the multiple frequency channels while performing wireless communication with each of the plurality of slave communication devices. The communication system further comprises: a storage unit storing, for each of the plurality of slave communication devices, multiple reference communication characteristics related to wireless communication over the multiple frequency channels, the reference communication characteristics being characteristics that were obtained when the at least one master communication device communicated with each of the plurality of slave communication devices over the multiple frequency channels; and at least one second processor programmed to determine, for each of the plurality of slave communication devices, an abnormality in wireless communication between the at least one master communication device and each of the plurality of slave communication devices based on strength of correlation between: (a) an overall trend of the multiple communication characteristics across the multiple frequency channels obtained by the at least one first processor regarding wireless communication over the multiple frequency channels between the at least one master communication device and each of the plurality of slave communication devices; and (b) an overall trend of the multiple reference communication characteristics across the multiple frequency channels that are stored in the storage unit for each of the plurality of slave communication devices.

According to a third aspect of the present disclosure, a method for a communication system including: at least one master communication device; and a plurality of slave communication devices, wherein the at least one master communication device and the plurality of slave communication devices are arranged at fixed positions. The at least one master communication device is capable of wirelessly communicating with each of the plurality of slave communication devices over multiple frequency channels. The method includes: obtaining, for each of the plurality of slave communication devices, multiple communication characteristics related to wireless communication over the multiple frequency channels while performing wireless communication with each of the plurality of slave communication devices; storing, for each of the plurality of slave communication devices, multiple reference communication characteristics related to wireless communication over the multiple frequency channels, the reference communication characteristics being characteristics that were obtained when the at least one master communication device communicated with each of the plurality of slave communication devices over the multiple frequency channels; and determining, for each of the plurality of slave communication devices, an abnormality in wireless communication between the at least one master communication device and each of the plurality of slave communication devices based on strength of correlation between: (a) an overall trend of the multiple communication characteristics across the multiple frequency channels obtained by the at least one first processor regarding wireless communication over the multiple frequency channels between the at least one master communication device and each of the plurality of slave communication devices; and (b) an overall trend of the multiple reference communication characteristics across the multiple frequency channels that are stored in the storage unit for each of the plurality of slave communication devices.

As described above, according to the communication system of the present disclosure and the method for the same, the abnormality determination unit determines, for each of the plurality of slave communication devices, an abnormality in the wireless communication between the master communication device and the plurality of slave communication devices, by utilizing the overall trend of multiple communication characteristics on the multiple frequency channels. Therefore, even when normal communication cannot be performed on part of frequency channels due to an external factor, it is possible to prevent an erroneous determination that one of the communication devices has a failure.

In the communication system configured and the method as described above, at least two master communication devices are provided, and each of the at least two master communication devices is capable of wirelessly communicating with each of the plurality of slave communication devices over the multiple frequency channels, and the abnormality determination unit determines an abnormality in wireless communication between the master communication device and the plurality of slave communication devices, for (a) each of the at least two master communication devices and (b) each of the plurality of slave communication devices, and it may be preferable to further include an abnormal position determination unit determining, based on an abnormality determination result of the wireless communication by the abnormality determination unit, that an abnormality has occurred in which of (a) the at least two master communication devices, (b) the plurality of slave communication devices, and (c) a communication propagation path between the master communication device and the plurality of slave communication devices.

By considering the abnormality determination result of wireless communication with the plurality of slave communication devices for each of the at least two master communication devices, the abnormal position determination unit is enabled to accurately determine which of (a) the at least two master communication devices, (b) the plurality of slave communication devices, and (c) the communication propagation path between the master communication device and the plurality of slave communication devices has an abnormality.

Hereinafter, an embodiment of a communication system according to the present disclosure is described in detail with reference to the drawings. In a plurality of drawings, the same or similar parts may be denoted by the same reference numerals, and overlapping descriptions may be omitted.

FIG. 1 is a configuration diagram showing an overall configuration of a communication system 100 according to a present embodiment. The communication system 100 according to the present embodiment, as shown in FIG. 1, includes a management device 10, first and second master communication devices 20A and 20B, and first to fifth slave communication devices 30A to 30E. In the following description, the first and second master communication devices 20A and 20B may be collectively referred to as a master communication device 20. Similarly, the first to fifth slave communication devices 30A to 30E may be collectively referred to as a slave communication device 30. Note that the number of master communication devices 20 is not limited to two, and at least one or more master communication devices may be provided. Similarly, the number of slave communication devices 30 is not limited to five, and two or more slave communication devices may be provided.

The communication system 100 according to the present embodiment is installed in a vehicle, for example, and used to perform communication between plural pieces of in-vehicle equipment and at least one control unit that controls and manages the plural pieces of in-vehicle equipment. In such case, for example, at least one master communication device 20 is connected to at least one control unit, and a plurality of slave communication devices 30 are connected to each of the plural pieces of in-vehicle equipment. The master communication device 20 and the plurality of slave communication devices are each arranged at a fixed position in the vehicle.

As a specific application in vehicles, the communication system 100 according to the present embodiment is applied to a battery management system that manages batteries mounted as battery packs in electrified vehicles, such as, for example, electric vehicles, hybrid vehicles, and plug-in hybrid vehicles and the like. In a battery management system, a monitoring device as an in-vehicle equipment is provided for each of a plurality of battery stacks forming a battery pack. Each of the monitoring devices for a plurality of battery stacks obtains battery information such as the voltage and current of each battery cell included in the battery stack and the temperature of the battery stack using various sensors and the like.

When each of the monitoring devices receives data requesting battery information from a battery control device as a control unit via the communication system 100, each of the monitoring devices sends the obtained battery information to the battery control device via the communication system 100. Based on the obtained battery information, the battery control device calculates the state of charge (SOC) of the entire battery stack, drives the temperature raising/cooling mechanism to adjust the temperature of the battery pack to an appropriate range, and determines whether or not it is necessary to perform a so-called equalization process to equalize the voltages of each of the battery cells. When the battery control device determines that at least one battery stack needs to perform the equalization process, it instructs the corresponding monitoring device to perform the equalization process via the communication system 100.

However, application examples of the communication system according to the present embodiment are not limited to vehicles, but to systems that control and manage various equipment in mobile objects other than vehicles, i.e., objects including aerial object such as drones, ships, construction machinery, agricultural machinery and the like. Furthermore, the communication system according to the present embodiment is also applicable to a system for controlling and managing various types of building equipment such as buildings and production facility such as factories.

The master communication device 20 is configured to be able to wirelessly communicate with each of the plurality of slave communication devices 30 on multiple frequency channels. For wireless communication between the master communication device 20 and each of the plurality of slave communication devices 30, for example, BLUETOOTH LOW ENERGY (BLE, where BLUETOOTH is a registered trademark) can be used. Alternatively, other wireless communication technologies including wireless LAN such as Wi-Fi (registered trademark) may be used.

In the configuration shown in FIG. 1, the first and second master communication devices 20A, 20B may be connected to the same control unit. In such case, when the communication system 100 is operating normally, the control unit may be configurable to use one of the first and second master communication devices 20A and 20B to communicate with the plurality of slave communication devices 30A to 30E. When one of the first and second master communication devices 20A and 20B fails, the control unit can still use the other of the first and second master communication devices 20A and 20B to communicate with the plurality of slave communication devices 30A to 30E.

Alternatively, at least one control unit may be configured to communicate with the plurality of slave communication devices 30A to 30E using the first and second master communication devices 20A and 20B from a time when the communication system 100 is still operating normally. That is, the first master communication device 20A may be configured to handle wireless communication with some of the plurality of slave communication devices 30A to 30E, and the second master communication device 20B may be configured to handle wireless communication with the rest of the plurality of slave communication devices 30A to 30E. In such case, the first and second master communication devices 20A and 20B communicate with different slave communication devices 30A to 30E at the same time, thereby increasing communication speed of communication between the master communication device 20 and the plurality of slave communication devices 30A to 30E. Furthermore, when one of the first and second master communication devices 20A and 20B fails, the control unit can still use the other of the first and second master communication devices 20A and 20B to communicate with the plurality of slave communication devices 30A to 30E.

Thus, according to the communication system 100 of the present disclosure, by connecting a plurality of master communication devices 20A and 20B to at least one control unit, even when one master communication device 20A or 20B fails, the control unit and in-vehicle equipment can continue to communicate with each other.

As shown in FIG. 1, the management device 10 is wired to the first and second master communication devices 20A and 20B. However, the management device 10 may be wirelessly connected to the first and second master communication devices 20A and 20B. The management device 10 executes self-diagnosis of the communication system 100 in a self-diagnosis mode based on various information obtained from the first and second master communication devices 20A and 20B, and diagnoses the presence or absence of an abnormality in the communication system 100. When the communication system 100 is diagnosed as having an abnormality by the self-diagnosis, the management device 10 determines the abnormal position in an abnormal position determination mode (i.e., an abnormal position determining process). Furthermore, the management device 10 also has a function of updating reference communication characteristics used for self-diagnosis and identification of an abnormality occurrence position.

Figure 2:
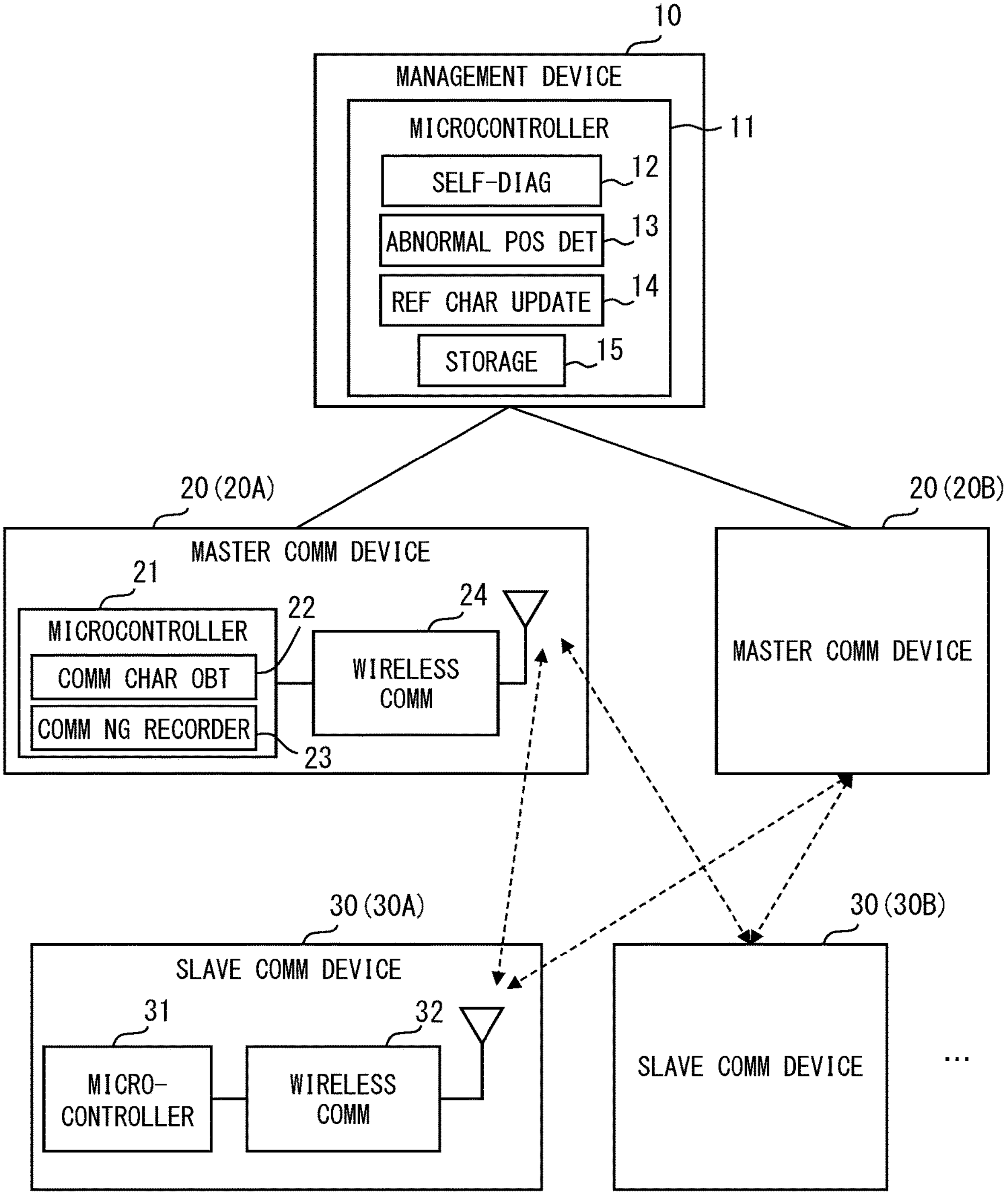
FIG. 2 is a configuration diagram showing an example of internal configurations of a management device, a master communication device, and a slave communication device.

FIG. 2 is a configuration diagram showing an example of internal configurations of the management device 10, the master communication device 20, and the slave communication device 30. As shown in FIG. 2, the management device 10, the master communication device 20, and the slave communication device 30 have microcontrollers 11, 21, and 31, respectively. The microcontrollers 11, 21, 31 are, respectively, a microcontroller including a CPU as a processor, a ROM and a RAM as memories, an input/output interface, and a bus connecting these elements. The CPU constructs multiple functional units by executing various programs stored in the ROM while using a temporary storage function of the RAM. In FIG. 2, some of the various functions executed by the microcontrollers 11, 21, and 31 are indicated by blocks.

The management device 10 has, as functions executed by the microcontroller 11, a self-diagnosis unit 12 that performs self-diagnosis, an abnormal position determination unit 13 that determines an abnormal position, and a reference characteristic update unit 14 that updates reference communication characteristics. The self-diagnosis unit 12, the abnormal position determination unit 13, and the reference characteristic update unit 14 are described later in detail. In addition, the microcontroller 11 of the management device 10 has a storage unit 15 storing in a storage medium, for each of the slave communication devices 30, the reference communication characteristics of each frequency channel when the master communication device 20 communicates with each of the plurality of slave communication devices 30 on multiple frequency channels In FIG. 2, the storage unit 15 is depicted as being provided inside the microcontroller 11, but the storage unit 15 may be provided outside the microcontroller 11 (i.e., the management device 10). Also, some of the various functions executed by the microcontroller 11 of the management device 10 may be realized by hardware circuits.

The master communication device 20 has, as a function executed by the microcontroller 21, a communication characteristics obtainer 22 that obtains information indicating communication characteristics related to wireless communication while performing wireless communication with each of the slave communication devices 30, and a communication NG recorder 23 for recording a slave communication device 30 to which connection cannot be established or with which communication cannot be performed. For example, the communication characteristics obtainer 22 obtains, as communication characteristic information, a received signal strength indicator (RSSI) indicating a reception strength of wireless communication, and a packet error rate (PER). The packet error rate may be replaced by bit error rate (BER). The bit error rate can be calculated from a packet error rate by a predetermined arithmetic expression.

As shown in FIG. 2, the master communication device 20 and the slave communication device 30 have wireless communicators 24 and 32, respectively, for sending and receiving packet data wirelessly. The wireless communicators 24, 32 have a sending function that modulates the packet data to be sent and sends it at an RF signal frequency. The wireless communicators 24 and 32 also have a reception function of demodulating received packet data. RF is an abbreviation for Radio Frequency.

The microcontroller 21 of the master communication device 20 encrypts sending data such as battery information request data, for example, using encryption information exchanged in a connection mode described later, and outputs the encrypted sending data to the wireless communicator 24. The wireless communicator 24 modulates the sending data output from the microcontroller 21 and sends it to the slave communication device 30 via an antenna. The wireless communicator 24 adds information required for wireless communication to the sending data and sends the data. Information required for wireless communication includes, for example, an identifier (ID), a sequence number, a next sequence number, an error detection code, and the like. The wireless communicator 24 also controls a data size, schedule, error detection, etc. of wireless communication.

The wireless communicator 32 of the slave communication device 30 receives the data sent from the wireless communicator 24 of the master communication device 20 via an antenna and demodulates it. The demodulated data is given to the microcontroller 31 of the slave communication device 30. For example, when the received data is a sending request for battery information, the microcontroller 31 of the slave communication device 30 sends the sending request to the corresponding battery stack monitoring device. The monitoring device outputs the obtained battery information to the slave communication device 30 in order to respond to the sending request. Then, the microcontroller 31 of the slave communication device 30 sends the battery information output from the monitoring device to the wireless communicator 24 of the master communication device 20 via the wireless communicator 32.

Figure 3:
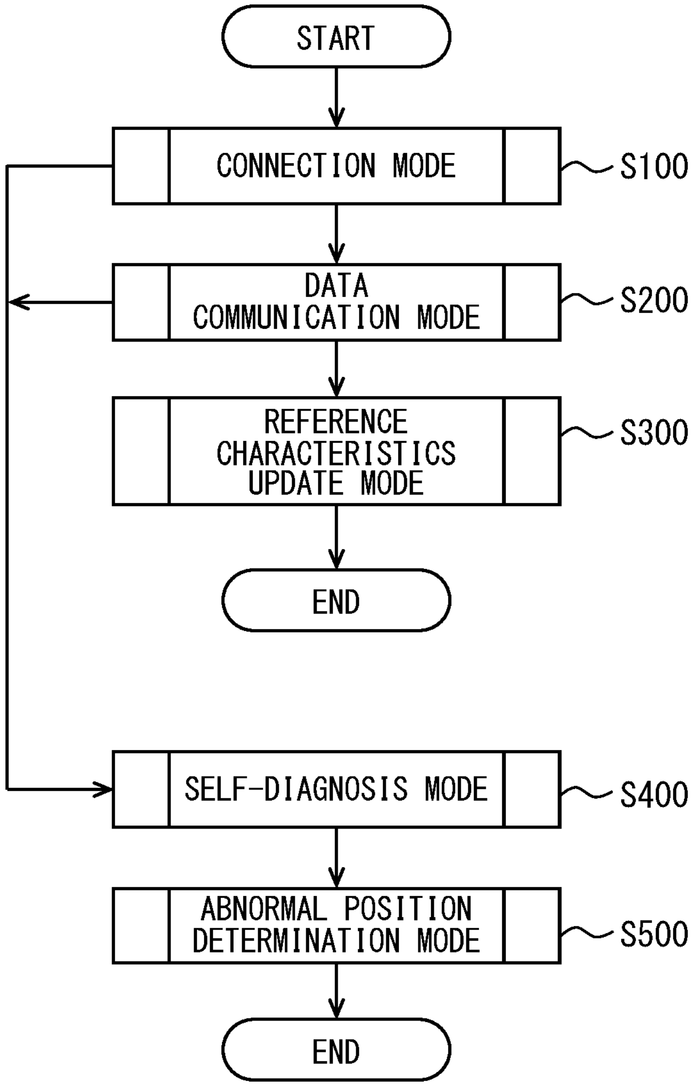
FIG. 3 is a flowchart showing a flow of a process executed in the communication system.

Next, various processes executed in the communication system 100 according to the present embodiment are described. FIG. 3 is a flowchart showing a flow of a process executed in the communication system 100. The process shown in the flowchart of FIG. 3 is started, when, for example, a main switch of the vehicle is turned on and electric power is supplied to the devices 10, 20, and 30 of the communication system 100. Then, a data communication mode process of step S200 is continuously executed until the main switch is turned off. When the main switch is turned off, the data communication mode of step S200 is terminated, and after performing required process(s), the process shown in the flowchart of FIG. 3 is terminated.

However, in case where intermittent communication between the master communication device 20 and the slave communication device 30 is sufficient, such as when the communication system 100 is applied to the above-described battery management system, the process shown in the flowchart of FIG. 3 may end each time the intermittent communication between the master communication device 20 and the slave communication device 30 ends. Then, at the next communication timing, a sequence starting from a connection mode process of step S100 may be executed.

The connection mode process of step S100 and the data communication mode process of step S200 shown in the flowchart of FIG. 3 are mainly executed by the master communication device 20 and the slave communication device 30. On the other hand, regarding a reference characteristics update mode process in step S300, a self-diagnosis mode process in step S400, and an abnormal position determination mode process (or may be referred as abnormal position determining process) in step S500, the management device 10 takes the lead in performing them, in cooperation with the master communication device 20 and the slave communication device 30. The self-diagnosis unit 12 of the microcontroller 11 of the management device 10 shown in FIG. 2 takes the lead in performing the self-diagnosis mode process of step S400. The abnormal position determination unit 13 of the microcontroller 11 of the management device 10 takes the lead in performing the abnormal position determination mode process in step S500. The reference characteristic update unit 14 of the microcontroller 11 of the management device 10 takes the lead in performing the reference characteristics update mode process of step S300.

Figure 4:
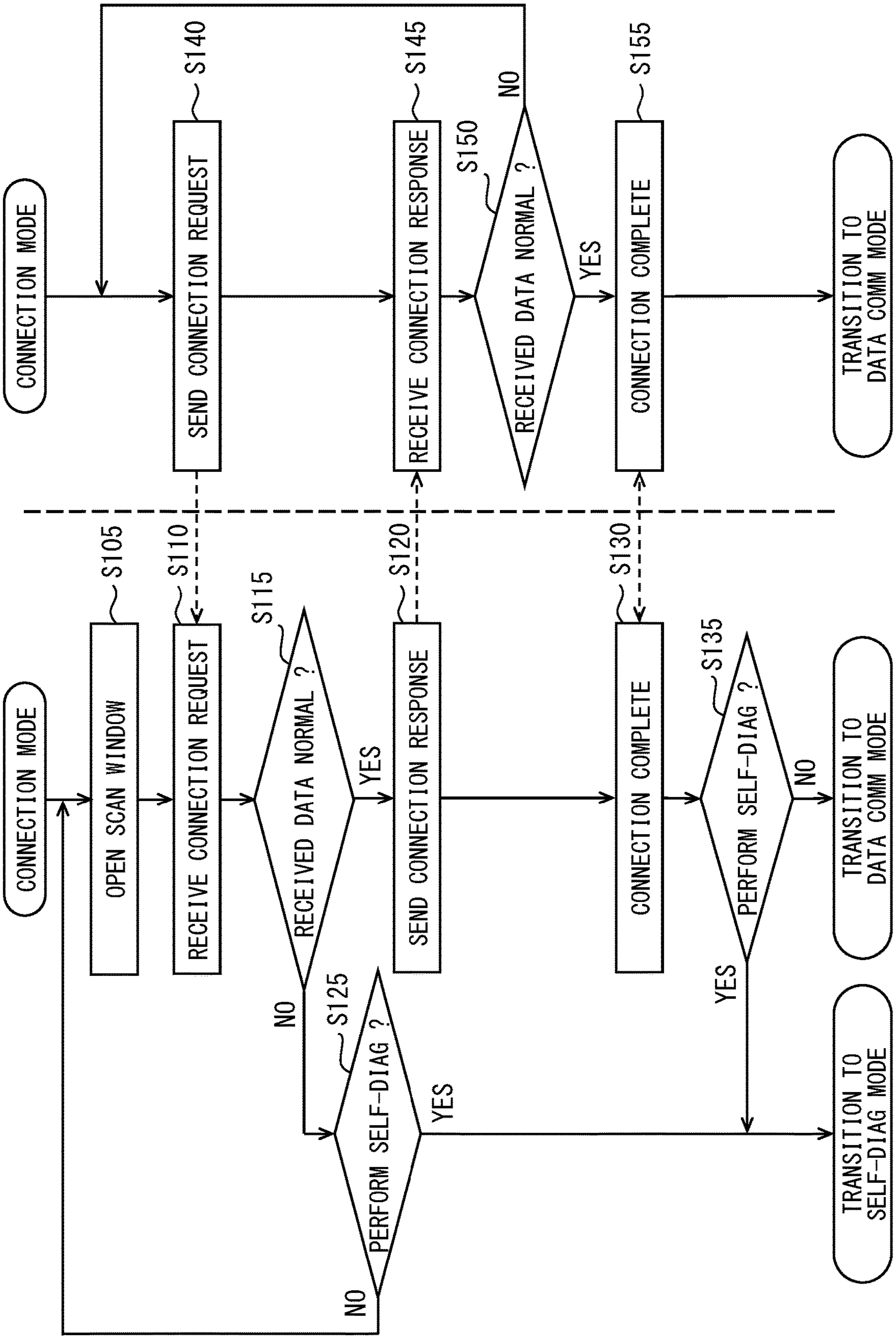
FIG. 4 is a flowchart showing a detail of a restriction notification process.

First, the details of the connection mode process are described with reference to the flowchart of FIG. 4. Note that, in FIG. 4, the flowchart on the left shows the process performed by the master communication device 20, and the flowchart on the right shows the process performed by the slave communication device 30.

In the connection mode process, the master communication device 20 opens a scan window, and performs a scanning operation in step S105. For example, in the case of BLE, as a scanning operation, the master communication device 20 periodically puts a transmission channel of an advertisement packet (i.e., connection request) from the slave communication device 30 into a receivable state for a predetermined period of time. On the other hand, in step S140, the slave communication device 30 sends a connection request through a connection request transmission channel, and executes an advertising operation. A start of the scanning operation may be earlier than, approximately the same timing as, or later than a start of the advertising operation. The connection request includes ID information of itself (i.e., the slave communication device 30) and master communication device 20, and the like.

In step S110, the master communication device 20 receives data including a connection request from the slave communication device 30. Next, in step S115, the master communication device 20 determines whether the received data is normal, that is, whether the data including the connection request from the slave communication device 30 has been normally received based on the error detection code included in the received data, for example. If the received data is normal, the process proceeds to step S120. In step S120, the master communication device 20 sends data including a connection response to the slave communication device 30 that has sent data including the connection request. On the other hand, if the received data is not normal, the process proceeds to step S125. In step S125, the master communication device 20 determines whether it is necessary to perform self-diagnosis. For example, the master communication device 20 can determine that the self-diagnosis needs to be performed when the number of times the received data is determined as not normal reaches a predetermined number of times in step S115. When it is determined that the self-diagnosis needs to be performed, the master communication device 20 transitions to the self-diagnosis mode. When it is determined that the self-diagnosis is not necessary, the master communication device 20 returns to step S105, and continues the scanning operation.

In step S145, the slave communication device 30 receives data including the connection response from the master communication device 20. Next, in step S150, the slave communication device 30 determines whether the received data is normal, that is, whether the data including the connection response from the master communication device 20 has been normally received, based on the error detection code included in the received data, for example. When the received data is normal, the process proceeds to step S155. On the other hand, if the received data is not normal, the process returns to step S140, and the slave communication device 30 sends data including the connection request to the master communication device 20 again.

The master communication device 20 and the slave communication device 30 perform a connection completion process in steps S130 and S155, respectively. The connection completion process includes a process for exchanging unique information. For example, in the process of exchanging unique information, the unique information held by the master communication device 20 and the slave communication device 30 are exchanged and stored in their respective memories. Accordingly, encryption using the exchanged unique information is possible. Unique information is, for example, key information or information for generating a key.

A connection is thus established between the master communication device 20 and the slave communication device 30. Once the connection is established, the slave communication device 30 stops sending data including the connection request. Then, the master communication device 20 and the slave communication device 30 transition to the data communication mode.

Note that, before switching to the data communication mode, the master communication device 20 determines in step S135 whether or not it is necessary to perform self-diagnosis. In such determination, for example, the master communication device 20 can determine that the self-diagnosis needs to be performed in case that, even though the master communication device 20 itself has performed the connection completion process, the corresponding slave communication device 30 continues to send data including a connection request. Alternatively, the master communication device 20 may determine that it is necessary to perform self-diagnosis when such a state occurs continuously for a predetermined number of times.

The master communication device 20 (i.e., the first and second master communication devices 20A, 20B) individually performs the above-described connection mode process with each of the plurality of slave communication devices 30. When the master communication device 20 cannot establish a connection with the slave communication device 30 by the connection mode process described above, the communication NG recorder 23 records the slave communication device 30 to which the connection could not be established together with the time of such connection attempt. Note that the communication NG recorder 23 has a function of periodically recording (a) the slave communication devices 30 with which connection could not be established and (b) the slave communication devices 30 with which communication could not be established, together with the time at a predetermined cycle. Therefore, the slave communication device 30 that cannot establish a connection is recorded as the slave communication device 30 that has continuously failed to communicate in the recording of each predetermined cycle.

Figure 5:
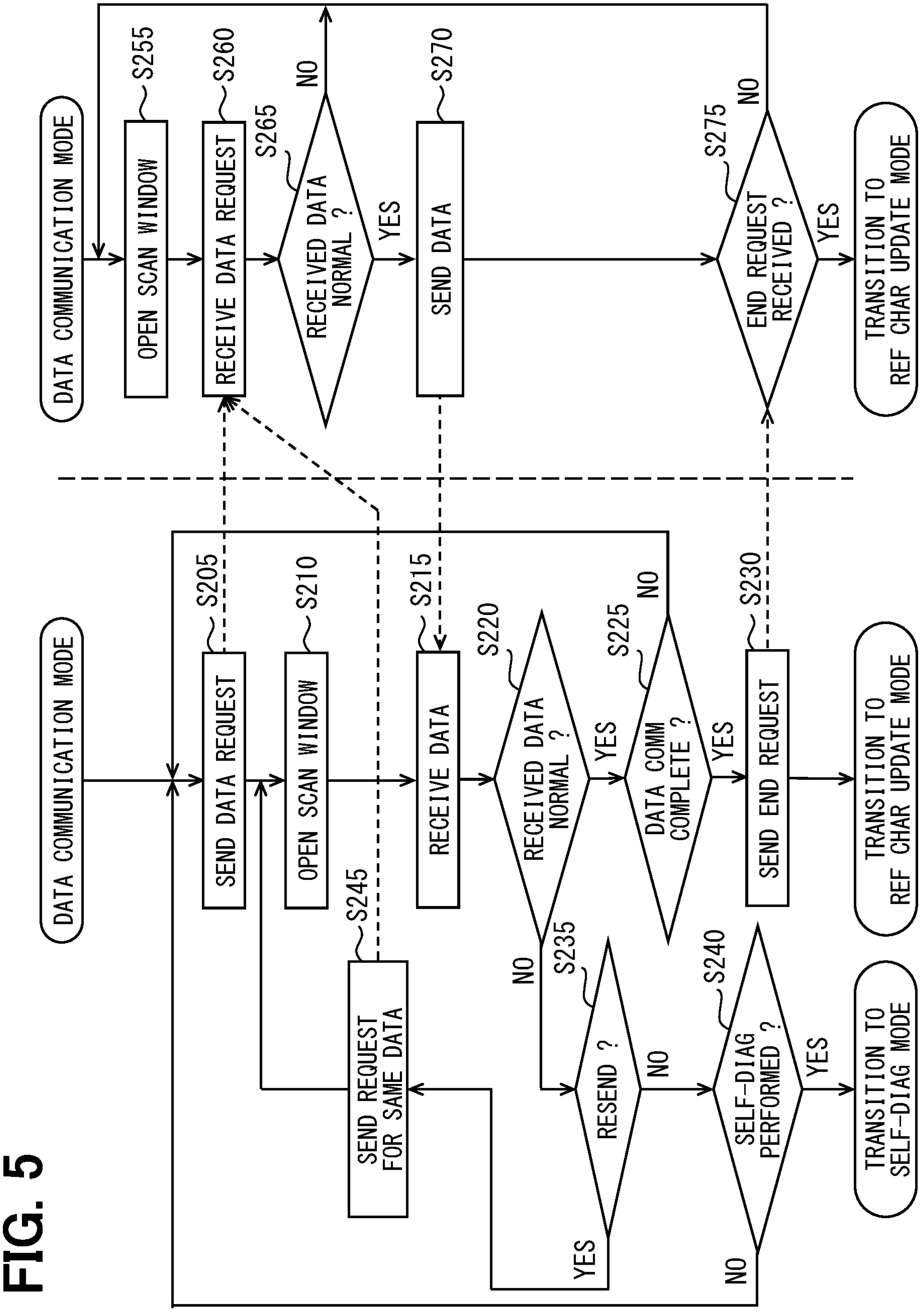
FIG. 5 is a flowchart showing a detail of a data communication mode process.

Next, details of the data communication mode process are described with reference to the flowchart of FIG. 5. Note that, in FIG. 5, the flowchart on the left shows the process performed by the master communication device 20, and the flowchart on the right shows the process performed by the slave communication device 30.

In step S255, the slave communication device 30 opens a scan window according to connection parameters notified from the master communication device 20, and performs a scanning operation. For example, in the case of BLE, connection parameters include a transmit window size that indicates a transmission period of data packets, a connection interval that indicates a frequency channel hop cycle, a channel mapping that indicates which data channel is to be used in a connection event, a hop increment that specifies an order of channel switching, and the like. Based on the above-described connection parameters, the slave communication device 30 puts, as a scanning operation, the signal of the frequency channel used for transmission into a receivable state at the timing when packet data is sent from the master communication device 20.

In step S205, the master communication device 20 sends a data request to the slave communication device 30 via the corresponding frequency channel in synchronization with the timing at which the slave communication device 30 opens the scan window. The slave communication device 30 receives the data request sent from the master communication device 20 in step S260. Next, in step S265, the slave communication device 30 determines whether the received data is normal, that is, whether the data request from the master communication device 20 has been normally received, for example, based on the error detection code included in the received data. When the received data is normal, the process proceeds to step S270. In step S270, the slave communication device 30 obtains the requested data from, for example, the control device of the corresponding equipment or the like, and sends it to the master communication device 20. On the other hand, when the received data is not normal, the slave communication device 30 returns to the process of step S255, opens the scan window according to the above connection parameters, and performs the scanning operation.

After sending the data request in step S205, the master communication device 20 performs, in step S210, a scanning operation to open a scan window in preparation for receiving packet data sent from the slave communication device 30. The master communication device 20 receives the packet data sent by the slave communication device 30 in step S215. Next, in step S220, the master communication device 20 determines whether the received data is normal, that is, whether the data sent by the slave communication device 30 has been normally received, based on the error detection code included in the received data, for example.

When the received data is correct, the master communication device 20 proceeds to the process of step S225. In step S225, the master communication device 20 determines whether or not to end the data communication mode. For example, when the communication system 100 is applied to a vehicle, and the master communication device 20 and the slave communication device 30 continuously communicate with each other while the vehicle is in operation, the master communication device 20 may determine that the data communication mode ends in response to a turning off of the main switch of the vehicle. Alternatively, when the master communication device 20 and the slave communication device 30 intermittently communicate, the master communication device 20 may determine that the data communication mode has ended when a predetermined communication period has lapsed.

When determining that the data communication mode has ended, the master communication device 20 proceeds to the process of step S230. In step S230, the master communication device 20 sends an end request of data communication to the slave communication device 30. After that, the master communication device 20 transitions to the reference characteristics update mode. Also, when the slave communication device 30 determines in step S275 that it has received an end request of data communication from the master communication device 20, it transitions to the reference characteristics update mode. Note that the master communication device 20 may transition to the reference characteristics update mode without sending the end request of data communication. The slave communication device 30 does not necessarily have to distinguish between the data communication mode and the reference characteristics update mode. The slave communication device 30 may simply be configured to (a) send the requested data in response to receiving a data request from the master communication device 20, or (b) continuously send advertisement packets when the connection is not yet established or has ended. If the data communication mode does not end, the master communication device 20 returns to the process of step S205, and the slave communication device 30 returns to the process of step S255.

On the other hand, when the received data is not normal, the master communication device 20 proceeds to the process of step S235. In step S235, the master communication device 20 determines whether or not to resend the same data request as the already-sent data request. For example, in the case of BLE, whether or not to resend the same data request can be determined based on SN (Sequence Number) bit and NESN (Next Expected Sequence Number) bit included in the header. Initially, the SN bit and NESN bit are set to zero. When the data transmission from the master communication device 20 to the slave communication device 30 succeeds, the NESN bit is set to 1 in the next data transmission from the slave communication device 30 to the master communication device 20. Then, since the NESN bit is 1, the master communication device 20 sends data with the SN bit set to 1 to the slave communication device 30. In the above case, when the NESN bit is 0, it means that the data transfer has failed. Therefore, the master communication device 20 can determine that it is necessary to resend the previously sent data whose SN bit is 0. Also, when using a wireless communication protocol other than BLE, it is possible to determine whether or not to resend based on ACK/NACK, for example. When resending, the master communication device 20 proceeds to the process of step S245 and sends the same data request as before on the same frequency channel or the next frequency channel after frequency hopping. When not resending, the master communication device 20 proceeds to the process of step S240.

In step S240, the master communication device 20 determines whether it is necessary to perform self-diagnosis. For example, the master communication device 20 can determine that the self-diagnosis needs to be performed when the number of times the received data is determined as not normal reaches a predetermined number of times in step S220. When it is determined that the self-diagnosis needs to be performed, the master communication device 20 transitions to the self-diagnosis mode. When it is determined that the self-diagnosis is not necessary, the master communication device 20 returns to step S205.

In the above-described data communication mode process, when an abnormality occurs in data transmission/reception and the slave communication device 30 is unable to perform normal communication, the master communication device 20 stores the abnormal slave communication device 30 recorded with time in the communication NG recorder 23. FIG. 6 is a diagram showing an example of recorded contents of the communication NG recorder 23 of the master communication device 20. The example shown in FIG. 6 indicates that the master communication device 20 continuously has an abnormality with the slave communication device 30 indicated as "S2." Although FIG. 6 shows an example in which the slave communication devices 30 that can communicate normally are also recorded, the recording of the slave communication devices 30 that are normal is optional.

Figure 7:
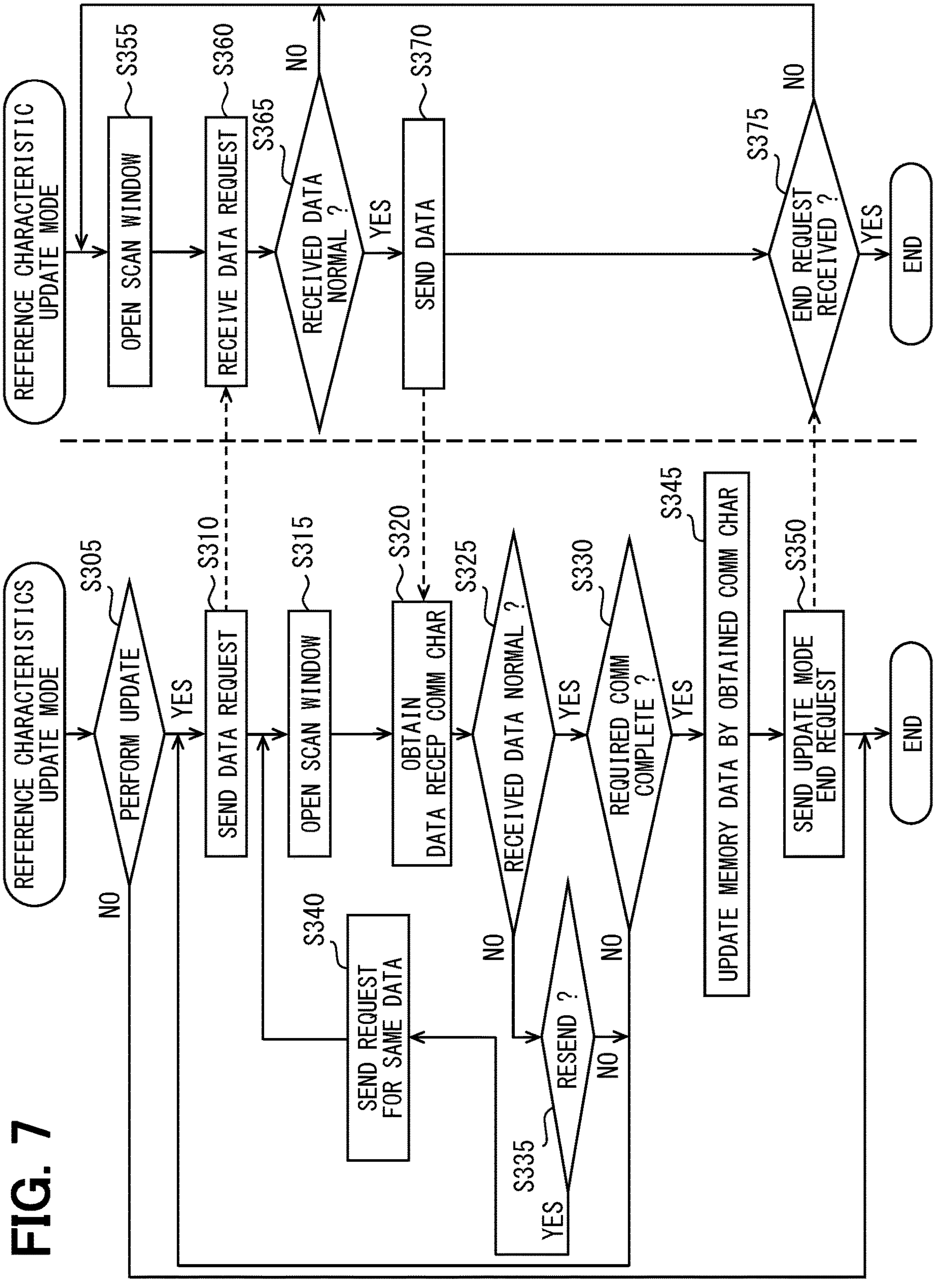
FIG. 7 is a flowchart showing a detail of a reference characteristics update mode process.

Next, details of the reference characteristics update mode process is described with reference to the flowchart of FIG. 7. Note that, in FIG. 7, the flowchart on the left shows the process performed by the management device 10 and the master communication device 20, and the flowchart on the right shows the process performed by the slave communication device 30.

As described above, the storage unit 15 of the management device 10 stores, in a storage medium, the reference communication characteristics (RSSI, PER) for each of the slave communication devices 30 and regarding each frequency channel when performing communication between the master communication device 20 and the plurality of slave communication devices 30 on multiple frequency channels. The reference communication characteristics can be obtained by actually measuring RSSI and PER in a state where the master communication device 20 and the slave communication device 30 are disposed to an installation object such as a vehicle and arranged at predetermined positions, for example.

However, the reference communication characteristics may possibly change over time or with changes in the installation environment. Therefore, in the present embodiment, the reference communication characteristics stored in the storage unit 15 are updated when a predetermined update condition is satisfied. As the predetermined update condition, for example, a predetermined period of time has lapsed from previously performing the reference characteristics update mode process, the vehicle traveled distance has increased by a predetermined distance since the previous reference characteristics update mode process was performed, and/or an update instruction from outside has been received, etc., can be employed.

In step S305, the management device 10 determines whether or not to update the reference characteristics based on whether or not the predetermined update condition described above is satisfied. When updating the reference characteristics, the management device 10 instructs the master communication device 20 to communicate with each of the slave communication devices 30 via multiple frequency channels (preferably, via all frequency channels used in the data communication mode). In response to such instruction, the master communication device 20 communicates with each of the slave communication devices 30. Note that, in the reference characteristics update mode, the master communication device 20 may communicate with each of the slave communication devices 30 using connection parameters different from those in the data communication mode.

Each of the slave communication devices 30 opens a scan window and performs a scanning operation according to the connection parameters notified from the master communication device 20 in step S355. Note that the connection parameters are set so that each of the slave communication devices 30 communicates with the master communication device 20 at respectively different timings. Here, when the above-described predetermined update condition is not satisfied and the update of the reference characteristics is not performed, even when the slave communication device 30 performs the scanning operation, it will not receive a data request from the master communication device 20. Therefore, when the slave communication device 30 does not receive a data request from the master communication device 20 even after the predetermined time has lapsed, the slave communication device 30 ends the reference characteristics update mode process without performing the process after step S360.

In step S310, the master communication device 20 sends a data request to each of the slave communication devices 30 via the corresponding frequency channel in synchronization with the timing at which each of the slave communication devices 30 opens the scan window. Each of the slave communication devices 30 receives the data request sent from the master communication device 20 in step S360. Then, each of the slave communication devices 30 determines whether the received data is normal in step S365, for example, based on the error detection code included in the received data. If the received data is normal, the process proceeds to step S370. In step S370, each of the slave communication devices 30 sends packet data to the master communication device 20. This packet data may be empty or may contain some data. On the other hand, if the received data is not normal, each of the slave communication devices 30 returns to the process of step S355, opens a scan window and performs a scanning operation according to the above-described connection parameters.

After sending the data request in step S310, the master communication device 20 performs a scanning operation to open a scan window in preparation for receiving packet data sent from the slave communication device 30 in step S315. The master communication device 20 receives the packet data sent by the slave communication device 30 in step S320. At this time, the communication characteristics obtainer 22 of the master communication device 20 obtains RSSI indicating the reception strength of packet data from the slave communication device 30 as communication characteristics.

Next, in step S325, the master communication device 20 determines whether the received data is normal, for example, based on the error detection code included in the received data. At this time, the communication characteristics obtainer 22 of the master communication device 20 obtains a packet error rate indicating the proportion of packet data that could not be received normally among the packet data sent by the slave communication device 30.

When the received data is normal, the master communication device 20 proceeds to the process of step S330. In step S330, the master communication device 20 determines whether or not the sending and receiving data required for updating the reference characteristics have been completed. For example, when sending and receiving data have not been performed with the individual slave communication devices 30 on most (i.e., the first predetermined number or more) or all of frequency channels, the master communication device 20 determines that required sending and receiving data (such as S330: REQUIRED COMM[UNICATION] COMPLETE?) have not been completed. In such case, the master communication device 20 returns to the process of step S310, changes the frequency channel, and repeats sending of the data request. On the other hand, if the master communication device 20 determines that required sending and receiving data have been completed, the process proceeds to step S345. In step S345, the management device 10 updates the reference communication characteristics stored in the storage unit 15 with the communication characteristics obtained by the communication characteristics obtainer 22 of the master communication device 20.

When the received data is not normal, the master communication device 20 proceeds to the process in step S335. In step S335, the master communication device 20 determines whether or not to resend the same data request as the already-sent data request. When resending, the master communication device 20 proceeds to the process of step S340 and sends the same data request as before on the same frequency channel or the next frequency channel after frequency hopping. When not resending, the master communication device 20 returns to the process of step S310.

In step S350 performed after step S345, the master communication device 20 sends an update mode end request to each of the slave communication devices 30 respectively. After that, the master communication device 20 ends the reference characteristics update mode process. When the slave communication device 30 determines in step S375 that it has received the update mode end request from the master communication device 20, it ends the reference characteristics update mode process. For the same reason as described above, the master communication device 20 does not have to send the update mode end request to each of the slave communication devices 30.

An example of (a) sending and receiving packet data between the master communication device 20 and the slave communication device 30, and (b) updating the reference communication characteristics stored in the storage unit 15 with the actual communication characteristics obtained by the sending and receiving data has been described above. However, the method of updating the reference communication characteristics is not necessarily limited to the example described above. For example, an external management server can collect communication characteristics from a plurality of communication systems 100 applied to vehicles of the same type, and can determine standard reference communication characteristics from the collected communication characteristics. Then, the management server may distribute the determined reference communication characteristics to each communication system 100, and in each communication system 100, the reference communication characteristics stored in the storage unit 15 may be updated with the distributed reference communication characteristics.

Figure 8:
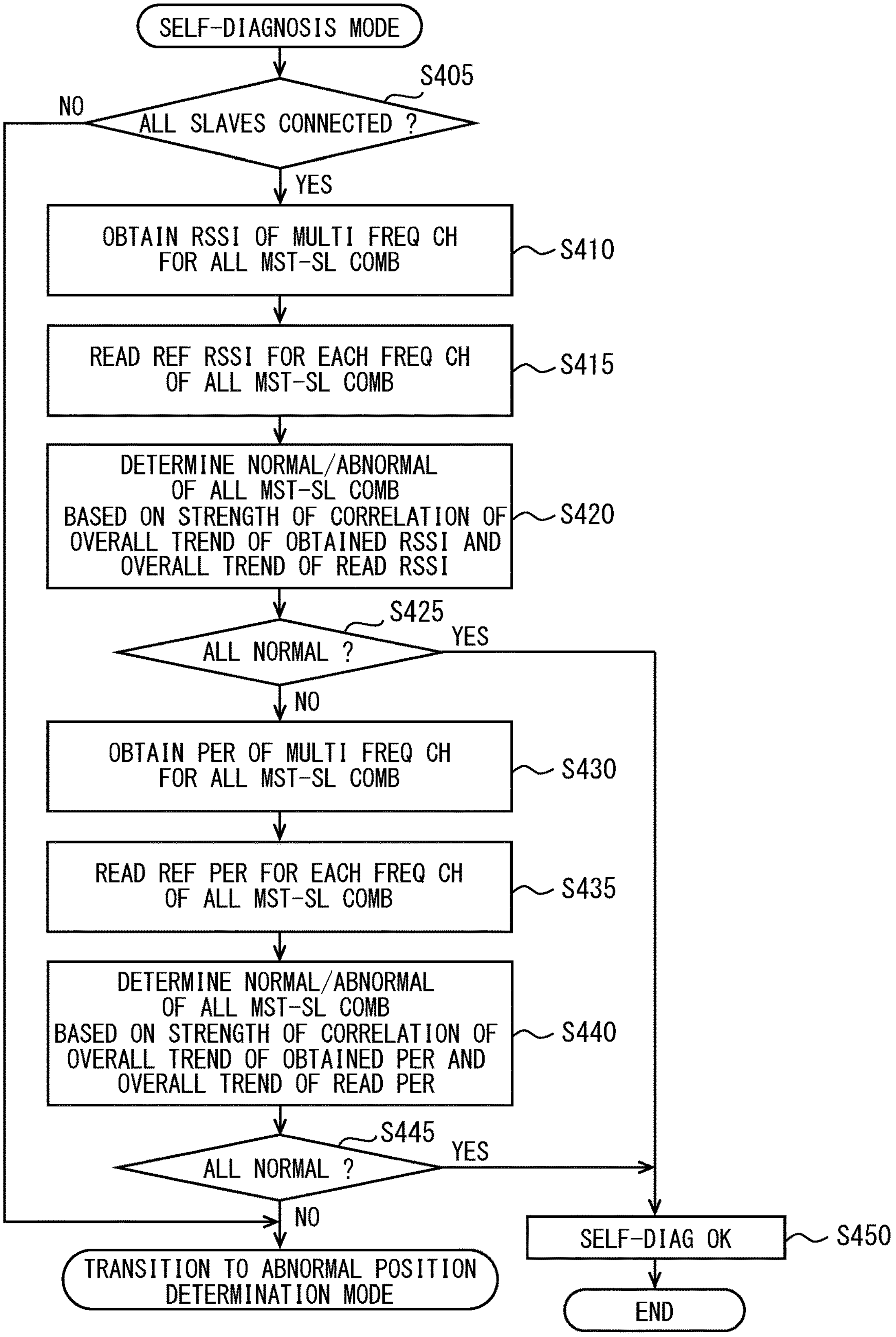
FIG. 8 is a flowchart showing a detail of a self-diagnosis mode process.

Next, the details of the self-diagnosis mode process are described with reference to the flowchart of FIG. 8.

The self-diagnosis unit 12 of the management device 10 first determines whether or not the master communication device 20 has established connections with all of the slave communication devices 30 in step S405. When the master communication device 20 has not established connections with all of the slave communication devices 30, it is obvious that some kind of abnormality has occurred in the communication system 100. Therefore, the self-diagnosis unit 12 of the management device 10 transitions to the abnormal position determination mode for identifying the abnormality occurrence position. On the other hand, when the master communication device 20 has established connections with all of the slave communication devices 30, the self-diagnosis unit 12 of the management device 10 proceeds to step S410.

In step S410, the self-diagnosis unit 12 of the management device 10 instructs the first and second master communication devices 20A and 20B to communicate with all of the slave communication devices 30A to 30E over multiple frequency channels and to obtain RSSI. In response to this instruction, wireless communication over multiple frequency channels is performed for all combinations of the master communication devices 20 and the slave communication device 30 perform, and the RSSI of each wireless communication is obtained. Each of the obtained RSSIs is provided from the master communication device 20 to the management device 10. Note that the self-diagnosis unit 12 of the management device 10 does not necessarily have to instruct the first and second master communication devices 20A and 20B to perform wireless communication with all of the slave communication devices 30A to 30E. For example, the self-diagnosis unit 12 of the management device 10 may instruct the first and second master communication devices 20A and 20B to perform wireless communication with some of the slave communication devices 30 in record of the communication NG recorder 23, including the slave communication device 30 having a communication abnormality, the slave communication device 30 that triggered the determination that self-diagnosis is required, and the like. Also, the multiple frequency channels may be all frequency channels, or may be not necessarily all but a second predetermined number or more of frequency channels.

At step S415, the self-diagnosis unit 12 of the management device 10 reads, from the storage unit 15, reference RSSIs, which are reference communication characteristics of each of multiple frequency channels over which the master communication device 20 has performed communication with each of the plurality of slave communication devices 30. Then, in step S420, the self-diagnosis unit 12 of the management device 10 determines, for each of the slave communication devices 30, an abnormality of wireless communication between the master communication device 20 and the plurality of slave communication devices 30 based on strength of correlation between (a) an overall trend of the plurality of obtained RSSIs on the multiple frequency channels and (b) an overall trend of the reference RSSIs over the multiple frequency channels, in all combinations of the master communication device 20 and the slave communication devices 30.

FIG. 9 shows an example of an overall trend of obtained RSSIs obtained when the master communication device 20 communicates with one slave communication device 30 over multiple frequency channels and an overall trend of the reference RSSIs. For example, as shown in FIG. 9, the strength of correlation between the overall trend of the obtained RSSIs and the overall trend of the reference RSSIs is calculable by (i) drawing waveforms of connecting (a) the multiple obtained RSSIs on multiple frequency channels and (b) the multiple reference RSSIs on multiple frequency channels, and (ii) examining a degree of matching between the waveforms. In the example shown in FIG. 9, when the obtained RSSI is the first obtained RSSI, the degree of matching between (a) the waveform of the reference RSSI obtained by connecting the reference RSSIs of multiple frequency channels and (b) the waveform of the first obtained RSSI obtained by connecting the obtained RSSIs of the multiple frequency channels is high. Therefore, the strength of the correlation between the reference RSSI waveform and the first obtained RSSI waveform is calculated as a value equal to or greater than a predetermined threshold. On the other hand, when the obtained RSSI is the second obtained RSSI, the degree of matching between (a) the reference RSSI waveform obtained by connecting the reference RSSIs of multiple frequency channels and (b) the second obtained RSSI waveform obtained by connecting the obtained RSSIs of the multiple frequency channels is low. Therefore, the strength of the correlation between the reference RSSI waveform and the second obtained RSSI waveform is calculated as a value less than the predetermined threshold.

Normality/abnormality determination based on the strength of correlation between the overall trend of the obtained RSSI and the overall trend of the reference RSSI is performed for each of the plurality of slave communication devices 30. In FIG. 10, for the first and second master communication devices 20A and 20B indicated by "M1" and "M2" and all the slave communication devices 30A to 30E indicated by "S1" to "S5," the table shows a state in which a determination of all normal has been made. In such case, in the determination process of step S425, it is determined that all combinations of communication between the master communication device 20 and the slave communication device 30 are normal. In such case, the process proceeds to step S450, and the self-diagnosis unit 12 of the management device 10 determines that the self-diagnosis is OK.

On the other hand, if all are not determined as normal in step S425, the process proceeds to step S430. In step S430, the self-diagnosis unit 12 of the management device 10 instructs the first and second master communication devices 20A and 20B to communicate with all of the slave communication devices 30A to 30E on multiple frequency channels, and to obtain PERs. In response to this instruction, regarding all combinations of the master communication device 20 and the slave communication device 30, wireless communication over multiple frequency channels is performed, and the PER of each wireless communication (packet data communication) is obtained. The obtained PERs are provided from each of the master communication devices 20 to the management device 10. In addition, as described above, the self-diagnosis unit 12 of the management device 10 may instruct the first and second master communication devices 20A and 20B to perform wireless communication with not all the slave communication devices 30 but some of the slave communication devices 30. Also, the multiple frequency channels may be all frequency channels, or may be not necessarily all but a second predetermined number or more of frequency channels. Also, obtaining of the PER in step S430 may be performed simultaneously performed with obtaining of the RSSI in step S410 described above.

In step S435, the self-diagnosis unit 12 of the management device 10 reads, from the storage unit 15, the reference PERs, which are reference communication characteristics of each of the multiple frequency channels when the master communication device 20 communicates with each of the plurality of slave communication devices 30 over the multiple frequency channels. Then, in step S440, the management device 10, for all combinations of the master communication device 20 and the slave communication devices 30, determines whether the wireless communication between the master communication device 20 and the plurality of slave communication devices 30 is normal or abnormal, for each of the slave communication devices 30, based on the strength of correlation between the overall trend of the plurality of obtained PERs over the multiple frequency channels for each of the slave communication devices 30 and the overall trend of the reference PERs.

FIG. 11 shows an example of the overall trend of the obtained PERs obtained when the master communication device 20 communicates with one slave communication device 30 over multiple frequency channels and the overall trend of the reference PERs. FIG. 11 shows an example in which the strength of correlation between the overall trend of the obtained PERs and the overall trend of the reference PERs is calculated from the ratio of similar data. That is, it is possible to (a) define an allowable range around the reference PER, and (b) calculate the strength of correlation from the ratio of obtained PERs falling within the allowable range. In the example shown in FIG. 11, when the obtained PER is the first obtained PER, the ratio of the obtained PERs within the allowable range around the reference PER in multiple frequency channels is high. Therefore, the strength of the correlation between the overall trend of the first obtained PERs and the overall trend of the reference PERs is calculated as a value equal to or greater than the predetermined threshold. On the other hand, when the obtained PER is the second obtained PER, the ratio of the obtained PERs within the allowable range around the reference PERs is low on multiple frequency channels. Therefore, the strength of the correlation between the overall trend of the second obtained PER and the overall trend of the reference PER is calculated as a value less than the predetermined threshold.

Note that the strength of the correlation between the overall trend of the obtained PER and the overall trend of the reference PER may be, as shown in the example of FIG. 9, calculated by (a) drawing waveforms by connecting the respective reference PERs, and (b) examining the degree of matching between the waveforms. Conversely, the strength of the correlation between the overall trend of the obtained PERs and the overall trend of the reference PERs may be calculated from the ratio of similar data, as shown in the example of FIG. 11.

Determination of normality or abnormality based on the strength of correlation between the overall trend of the obtained PERs and the overall trend of the reference PERs is performed regarding the first and second master communication devices 20A, 20B, for each of the plurality of slave communication devices 30. When all slave communication devices 30 are determined as normal, regarding the first and second master communication devices 20A and 20B, all combinations of the master communication devices 20 and the slave communication devices 30 are determined as normal by the determination process in step S445. In such case, the process proceeds to step S450, and the self-diagnosis unit 12 of the management device 10 determines that the self-diagnosis is OK. On the other hand, when all are not determined as normal in step S445, the self-diagnosis unit 12 of the management device 10 transitions to the abnormal position determination mode.

In such manner, the self-diagnosis unit 12 of the management device 10 utilizes an overall trend of multiple communication characteristics of multiple frequency channels, for a determination of whether the wireless communication between the first and second master communication devices 20A, 20B and the plurality of slave communication devices 30A to 30E is normal or abnormal, about each of the slave communication devices 30A to 30E. Therefore, even in case that normal communication is not performable on some frequency channels due to an external factor, it is possible to prevent erroneous determination that one of the communication devices 20A, 20B, 30A to 30E has a failure.

In addition, the self-diagnosis unit 12 of the management device 10 transitions to the abnormal position determination mode when at least one slave communication device 30 among the plurality of slave communication devices 30 is determined as abnormal in wireless communication, based on determinations of whether wireless communication is normal or abnormal for each of the slave communication devices 30.

In particular, the self-diagnosis unit 12 of the management device 10 first uses the RSSI as first communication characteristics information to determine, for each of the slave communication devices 30, whether the wireless communication between the master communication device 20 and the plurality of slave communication devices 30 is normal or abnormal, regarding each of the first and second master communication devices 20A and 20B. When the management device 10 determines that at least one slave communication device 30 is abnormal in wireless communication in normality/abnormality determination of the wireless communication for each of the slave communication devices 30 using RSSI, the management device 10 further uses the PER as second communication characteristics information to determine, for each of the slave communication devices 30, whether the wireless communication between the master communication device 20 and the plurality of slave communication devices 30 is normal or abnormal, regarding each of the first and second master communication devices 20A and 20B. Then, in case that the self-diagnosis unit 12 of the management device 10 also determines, by using the PER, that at least one slave communication device 30 has an abnormality in the wireless communication abnormality determination for each of the slave communication devices 30, transition to the abnormal position determination mode is made. Therefore, the abnormal position determination mode process is performed only when there is a high possibility that some kind of abnormality has occurred in the communication system 100.

Figure 12:
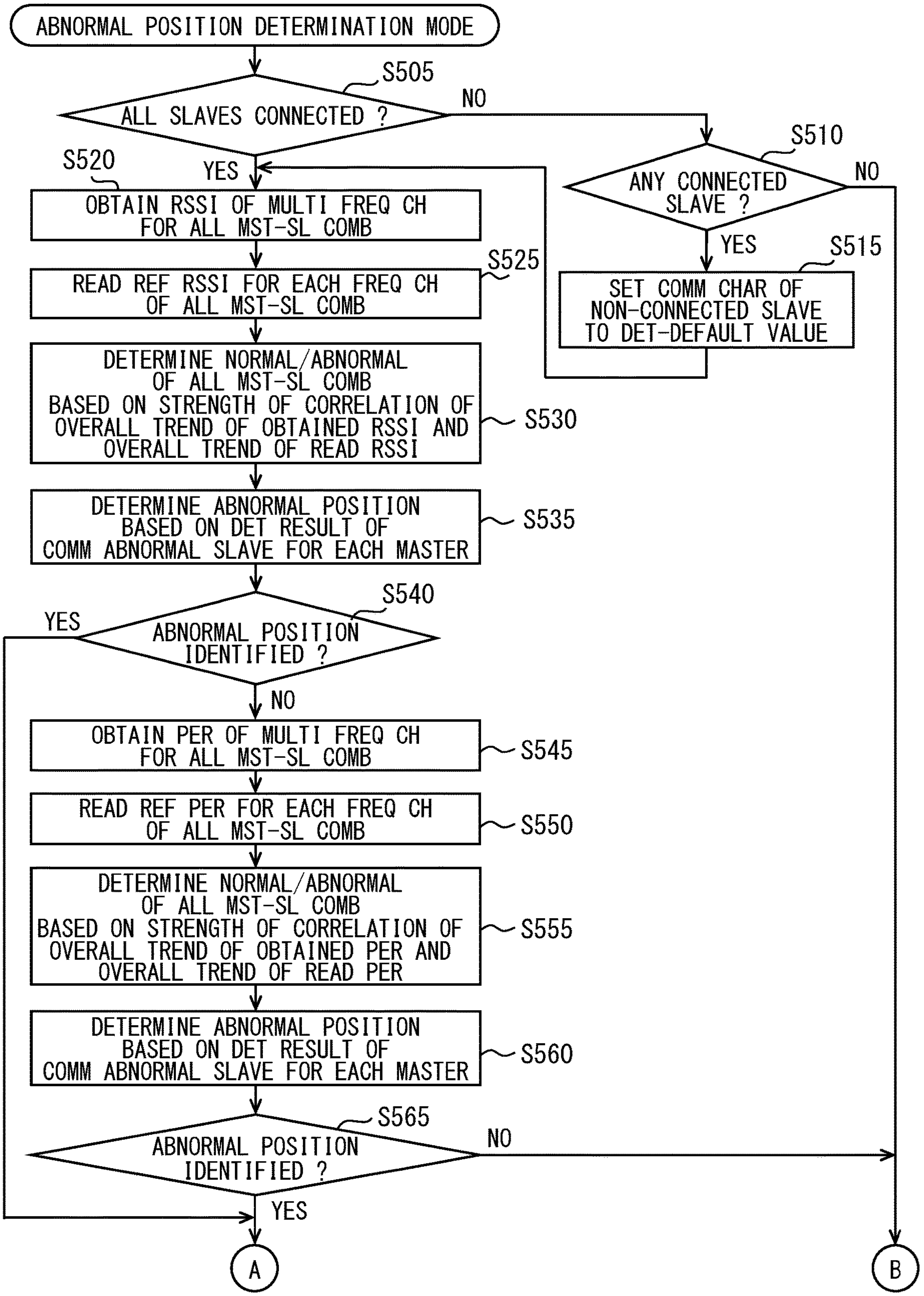
FIG. 12 is a part of a flowchart showing a detail of an abnormal position determination mode process.

Next, the details of the abnormal position determination mode process is described with reference to the flowchart of FIG. 12. The abnormal position determination mode process determines an abnormality occurring in which part of (a) the first and second master communication devices 20A and 20B, (b) the plurality of slave communication devices 30, and (c) the communication propagation path between the master communication device 20 and the plurality of slave communication devices 30, based on the determined determination result regarding each of the first and second master communication devices 20A and 20B whether wireless communication between the master communication device 20 and the plurality of slave communication devices 30 is normal or abnormal for each of the plurality of slave communication devices 30.

The abnormal position determination unit 13 of the management device 10 first determines whether or not the master communication device 20 has established connections with all of the slave communication devices 30 in step S505. When the master communication device 20 has not established connections with all of the slave communication devices 30, the process proceeds to step S510. In step S510, the abnormal position determination unit 13 of the management device 10 determines whether or not there is a connected slave communication device 30 having an established connection. When there is a connected slave communication device 30, the process proceeds to step S515. On the other hand, when there is no connected slave communication device 30, the process proceeds to step S590 in the flowchart of FIG. 13.

In step S515, since the abnormal position determination unit 13 of the management device 10 cannot obtain the communication characteristics of the unconnected slave communication device 30, the abnormal position determination unit 13 sets the obtained communication characteristics as a default determination value. The default determination value is a value that is set so that communication failure is determinable in steps S530 and S555, which is described later.

In step S520, which is performed subsequently to (a) step S515 or (b) when it is determined in step S505 that the master communication device 20 has established connections with all of the slave communication devices 30, the abnormal position determination unit 13 of the management device 10 instructs the first and second master communication devices 20A and 20B to communicate with all connected slave communication devices 30A to 30E on multiple frequency channels and to obtain RSSIs. In response to this instruction, wireless communication on multiple frequency channels is performed for all combinations of the master communication devices 20 and the connected slave communication devices 30, and the RSSI of each wireless communication is obtained. Each of the obtained RSSIs is provided from the master communication device 20 to the management device 10. The multiple frequency channels may be all frequency channels, or not necessarily all but may be a second predetermined number or more of frequency channels. Further, the RSSI obtained in the self-diagnosis mode may be used in the abnormal position determination mode without obtaining a new RSSI in the abnormal position determination mode.

In step S525, the abnormal position determination unit 13 of the management device 10 reads, from the storage unit 15, reference RSSIs, which are reference communication characteristics of each of multiple communication channels over which the master communication device 20 has performed communication with each of the plurality of slave communication devices 30. Then, in step S530, the abnormal position determination unit 13 of the management device 10 determines, for each of the slave communication devices 30, whether wireless communication between the master communication device 20 and the plurality of slave communication devices 30 is normal or abnormal based on strength of correlation between (a) an overall trend of the plurality of obtained RSSIs and (b) an overall trend of the reference RSSIs over the multiple frequency channels, in all combinations of the master communication device 20 and the slave communication devices 30. This determination process is performed in the same manner as the determination process in the self-diagnosis mode.

In step S535, the abnormal position determination unit 13 of the management device 10 determines the abnormal position for each of the slave communication devices 30, based on the determination results of whether wireless communication between the master communication device 20 and the plurality of slave communication devices 30 is normal or abnormal by using the RSSI, which is determined for each of the first and second master communication devices 20A and 20B. A method for determining an abnormal position is described in detail below.

First, the abnormal position determination unit 13 of the management device 10 determines that one of the master communication devices 20 is having an abnormality when (A) it is determined that wireless communication between (a) one of the first and second master communication devices 20A and 20B and (b) the plurality of slave communication devices 30 is all abnormal, and (B) it is determined that wireless communication between (c) the other one of the first and second master communication devices 20A and 20B and (d) at least one of the plurality of slave communication devices 30 is normal.

FIG. 14 shows an example of an abnormality determination result of wireless communication between the first and second master communication devices 20A and 20B and the plurality of slave communication devices 30A to 30E when one of the master communication devices is abnormal. In this example, it is determined that the wireless communication between the master communication device 20 indicated by “M1” and all of the slave communication devices 30 indicated by “S1” to “S5” is abnormal. Conversely, it is determined that the wireless communication between the master communication device 20 indicated by “M2” and all of the slave communication devices 30 indicated by “S1” to “S5” is normal. In such a case, it is determinable that an abnormality has occurred in the master communication device 20 indicated by “M1.” Note that it is possible to determine that the master communication device 20 indicated by “M1” is abnormal even when the wireless communication between the master communication device 20 indicated by “M2” and the slave communication devices 30 indicated by “S1” to “S5” is not all normal, and the wireless communication with some of the slave communication devices 30 is abnormal.

Next, the abnormal position determination unit 13 of the management device 10 determines that an abnormality is occurring in a slave communication device 30 when the slave communication device 30 determined in the following two situations (a) and (b) is the same, i.e., (a) the slave communication device 30 having wireless communication abnormality in a determination of whether wireless communication between one of the first and second master communication devices 20A and 20B and the plurality of slave communication devices 30 is normal or abnormal, and (b) the slave communication device 30 having wireless communication abnormality in a determination of whether wireless communication between the other one of the first and second master communication devices 20A and 20B and the plurality of slave communication devices 30 is normal or abnormal.

FIG. 15 is an example of determination results in two situations regarding a determination of whether wireless communication between the first and second master communication devices 20A and 20B and the plurality of slave communication devices 30A to 30E is normal or abnormal when one slave communication device 30 is abnormal. In this example, wireless communication between the master communication device 20 indicated by “M1” and the slave communication device 30 indicated by “S1” is determined as abnormal, and wireless communication the master communication device 20 indicated by “M1” and the slave communication device 30 indicated by “S2” to “S5” is determined as normal. Also, wireless communication between the master communication device 20 indicated by “M2” and the slave communication device 30 indicated by “S1” is determined as abnormal, and wireless communication between the master communication device 20 indicated by “M2” and the slave communication devices 30 indicated by “S2” to “S5” is determined as normal. In such manner, when the determination results of whether wireless communication is normal or abnormal between the first and second master communication devices 20A and 20B and the plurality of slave communication devices 30A to 30E match in two situations, the abnormal position determination unit 13 of the management device 10 can determine that the slave communication device 30 having been determined as having a communication abnormality in the two situations has an abnormality.

Further, the abnormal position determination unit 13 of the management device 10 determines that the communication propagation paths between the first and second master communication devices 20A and 20B and the plurality of slave communication devices 30 have an abnormality, when (A) it is determined that wireless communication between (a) one of the first and second master communication devices 20A and 20B and (b) the plurality of slave communication devices 30 is all abnormal, and (B) it is determined that wireless communication between (c) the other one of the first and second master communication devices 20A and 20B and (d) the plurality of slave communication devices 30 is all abnormal. An abnormality of the communication propagation paths can occur, for example, in a situation where a radio wave shielding object intervenes in the communication propagation path.

FIG. 16 shows an example of determination results regarding a determination of whether wireless communication between the first and second master communication devices 20A, 20B and the plurality of slave communication devices 30A to 30E is normal or abnormal when the communication propagation path has an abnormality. In this example, it is determined that the wireless communication between the master communication device 20 indicated by "M1" and all of the slave communication devices 30 indicated by "S1" to "S5" is abnormal. Similarly, it is also determined that the wireless communication between the master communication device 20 indicated by "M2" and all of the slave communication devices 30 indicated by "S1" to "S5" is abnormal. In such a case, it can be determined that an abnormality has occurred in the communication propagation path between the first and second master communication devices 20A, 20B and the plurality of slave communication devices 30.

Here, the abnormal position determination unit 13 of the management device 10 cannot identify the abnormal position where an abnormality is occurring in case that, (A) when an abnormality of wireless communication between the master communication device 20 and the plurality of slave communication devices 30 is determined for each of the slave communication device 30 by using the RSSI, which is the first communication characteristics information, and (B) when the determination results of wireless communication abnormality do not match among the first and second master communication devices 20A and 20B.

FIG. 17 shows an example of determination results of a determination whether wireless communication between (a) the first and second master communication devices 20A and 20B and (b) the plurality of slave communication devices 30A to 30E is normal or abnormal, with which the abnormal position where an abnormality is occurring is not determinable. As shown in FIG. 17, (A) the determination results of wireless communication abnormality between the master communication device 20 indicated by "M1" and all of the slave communication devices 30 indicated by "S1" to "S5," and (B) the determination results of wireless communication abnormality between the master communication device 20 indicated by "M2" and all of the slave communication devices 30 indicated by "S1" to "S5" do not match with each other, i.e., no regularity among the wireless communication abnormality determination results in two rows. In such a case, the abnormal position determination unit 13 of the management device 10 determines in step S540 that the abnormal position cannot be identified. When the abnormal position cannot be identified, the abnormal position determination unit 13 of the management device 10 proceeds to the process of step S545.

In step S545, the abnormal position determination unit 13 of the management device 10 instructs the first and second master communication devices 20A and 20B to communicate with all connected slave communication devices 30A to 30E on multiple frequency channels, and to obtain the PER. In response to such an instruction, wireless communication is performed on multiple frequency channels for all combinations of the master communication device 20 and the connected slave communication devices 30, and the PER of each wireless communication (i.e., packet data communication) is obtained. The obtained PERs are provided from each of the master communication devices 20 to the management device 10. Note that the multiple frequency channels may be all frequency channels, or not necessarily all but may be a second predetermined number or more of frequency channels. Also, obtaining the PER in step S545 may be simultaneously performed with obtaining the RSSI in step S520 described above. Alternatively, the PER obtained in the self-diagnosis mode may be used in the abnormal position determination mode.

In step S550, the abnormal position determination unit 13 of the management device 10 reads, from the storage unit 15, the reference PER, which is/are a reference communication characteristic or characteristics of each of the multiple frequency channels when the master communication device 20 has performed communication with each of the plurality of slave communication devices 30 on the multiple frequency channels. Then, in step S555, the abnormal position determination unit 13 of the management device 10 determines, for each of the slave communication devices 30, whether wireless communication between the master communication device 20 and the plurality of slave communication devices 30 is normal or abnormal, based on the magnitude of the correlation between (a) the overall trend of the obtained PERs on the multiple frequency channels, and (b) the overall trend of the reference PERs, in all combinations of the master communication device 20 and the slave communication devices 30.

In step S560, the abnormal position determination unit 13 of the management device 10 determines the abnormal position for each of the slave communication devices 30, based on the determination results of whether the wireless communication between the master communication device 20 and the plurality of slave communication devices 30 is normal or abnormal by using the PER, which is determined for each of the first and second master communication devices 20A and 20B. The determination method of the abnormal position is the same as the determination method of step S535.

In such manner, by considering the determination results of whether the wireless communication is normal or abnormal with the plurality of slave communication devices 30 for each of the first and second master communication devices 20A and 20B, the abnormal position determination unit 13 of the management device 10 can accurately determine which has an abnormality among (a) the first and second master communication devices 20A and 20B, (b) the plurality of slave communication devices 30, and (c) the communication propagation path between the master communication device 20 and the plurality of slave communication devices 30.

In addition, when the abnormal position determination unit 13 of the management device 10 cannot identify the abnormal position from wireless communication abnormality determination for each of the slave communication devices 30, based on the determination results of whether the wireless communication between the master communication device 20 and the plurality of slave communication devices 30 is normal or abnormal by using the RSSI, which is determined for each of the first and second master communication devices 20A and 20B, the abnormal position determination unit 13 of the management device 10 attempts to identify an abnormal position based on the determination results of whether the wireless communication with the communication devices 30 is normal or abnormal for each of the slave communication devices 30 by using the PER, which is determined for each of the first and second master communication devices 20A and 20B. Therefore, the possibility of identifying the abnormal position is raised. However, regardless of the success or failure of the abnormal position determination process using the RSSI, the abnormal position determination process using the PER may be performed. Then, in case that an abnormal position is determined in either one of the two abnormal position determination processes, the determined position may be considered as an abnormal position where an abnormality is occurring. Alternatively, when the determined abnormal positions of both abnormal position determination processes match with each other, the determined position may be considered as an abnormal position where an abnormality is occurring.

Figure 13:
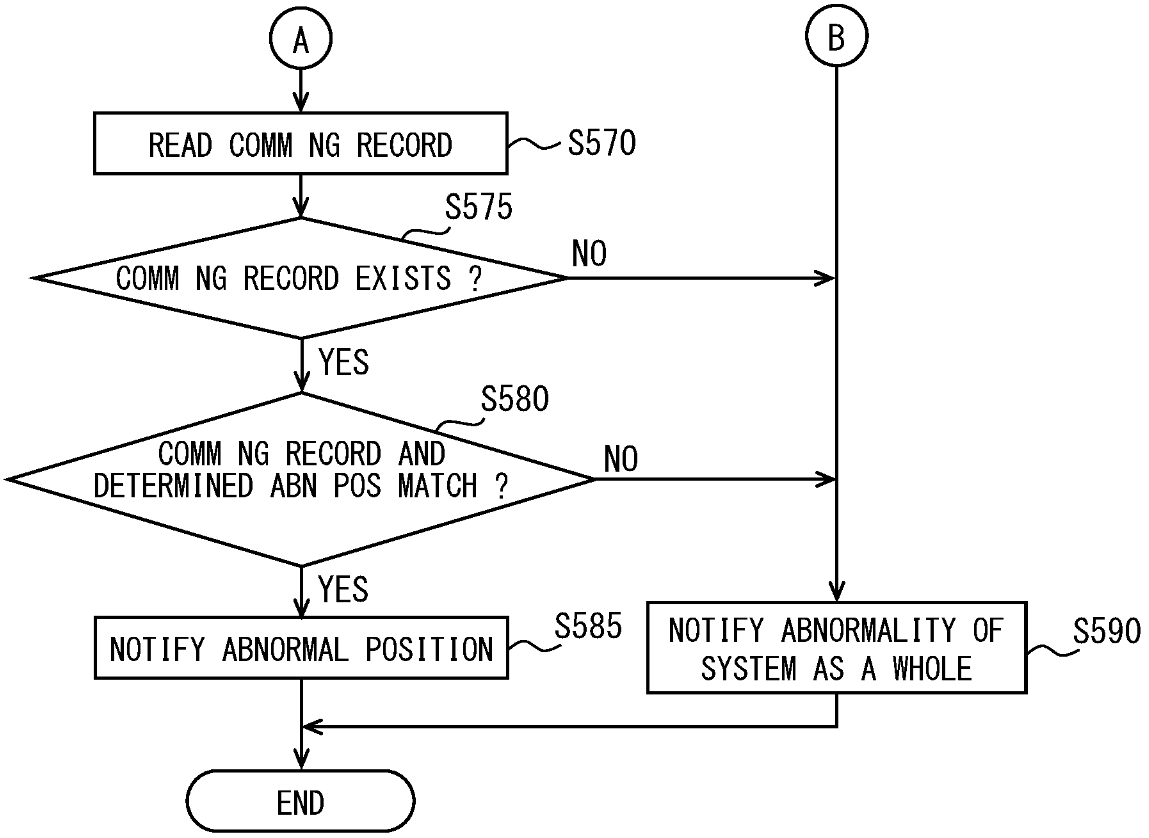
FIG. 13 is a remaining part of the flowchart showing the detail of the abnormal position determination mode process of FIG. 12.

When it is determined in step S540 or S565 that the abnormal position has been identified, the process proceeds to step S570 in the flowchart of FIG. 13. On the other hand, when it is determined that the abnormal position cannot be identified, the process proceeds to step S590.

In step S570, the abnormal position determination unit 13 of the management device 10 reads communication NG records from the communication NG recorders 23 of the first and second master communication devices 20A and 20B. In step S575, the abnormal position determination unit 13 of the management apparatus 10 determines whether or not a communication NG record exists based on the read communication NG record. When a communication NG record exists, the abnormal position determination unit 13 of the management device 10 proceeds to the process of step S580. When a communication NG record does not exist, the abnormal position determination unit 13 of the management device 10 proceeds to the process of step S590.

In step S580, it is determined whether or not the abnormality according to the communication NG record matches the abnormal position identified by the abnormal position determination mode. For example, when (a) communication with all of the slave communication devices 30 is recorded as abnormal in the communication NG record of one of the master communication devices 20, and (b) the abnormal position identified by the abnormal position determination mode is the one of the master communication devices 20 itself, it can be determined that the abnormality according to the communication NG record matches the abnormal position identified by the abnormal position determination mode. Also, when (a) the communication with a specific slave communication device 30 is recorded as abnormal in the communication NG records of the first and second master communication devices 20A and 20B, and (b) the abnormal position identified by the abnormal position determination mode is the specific slave communication device 30, it can be determined that the abnormality according to the communication NG record matches the abnormal position identified by the abnormal position determination mode.

When it is determined in step S580 that the abnormality according to the communication NG record matches the abnormal position identified by the abnormal position determination mode, the process proceeds to step S585 to notify a user or an administrator of the abnormal position. On the other hand, when it is determined in step S580 that the abnormality according to the communication NG record does not match the abnormal position identified by the abnormal position determination mode, the process proceeds to step S590. In step S590, since the abnormal position where an abnormality is occurring cannot be identified, the user or the administrator is notified of the abnormality in the communication system 100 as a whole.

The present disclosure is explained with a preferred embodiment as described above. However, the present disclosure is not limited to the above-mentioned embodiment, and may be variously modified within the spirit and scope of the present disclosure.

For example, in the embodiment described above, the communication system 100 using two master communication devices 20 has been described. However, the number of master communication devices 20 may be three or more. Alternatively, the number of master communication devices 20 may be one when the position of an abnormality is not accurately identified.

Further, in the above-described embodiment, RSSI is used as the first communication characteristics information and PER is used as the second communication characteristics information. However, PER may be used as the first communication characteristics information and RSSI may be used as the second communication characteristics information. Furthermore, communication characteristic information other than RSSI and PER may also be used.

Furthermore, in the above-described embodiment, the master communication device 20 and the plurality of slave communication devices 30 perform wireless communication for obtaining RSSI and PER in the self-diagnosis mode and in the abnormal position determination mode, respectively. However, wireless communication for obtaining RSSI and PER may be shared between the self-diagnosis mode and the abnormal position determination mode.

In the above-described embodiment, an example has been described in which the management device 10 performs the self-diagnosis mode first, and then performs the abnormal position determination mode when an abnormality in wireless communication is determined in the self-diagnosis mode. However, the management device 10 may perform only the self-diagnosis mode, and notify the user or the like of the result when an abnormality in wireless communication is determined in the self-diagnosis mode. Alternatively, the management device 10 may perform the abnormal position determination mode from the beginning without performing the self-diagnosis mode.

What is claimed is:

1. A communication system, comprising:

at least one master communication device;

a plurality of slave communication devices; and a management device, wherein the at least one master communication device and the plurality of slave communication devices are arranged at fixed positions, the at least one master communication device is capable of wirelessly communicating with each of the plurality of slave communication devices over multiple frequency channels, the at least one master communication device includes a communication characteristics obtainer obtaining, for each of the plurality of slave communication devices, multiple communication characteristics related to wireless communication over the multiple frequency channels while performing wireless communication with each of the plurality of slave communication devices, and the management device comprises:

a storage unit storing, for each of the plurality of slave communication devices, multiple reference communication characteristics related to wireless communication over the multiple frequency channels, the reference communication characteristics being characteristics that were obtained when the at least one master communication device communicated with each of the plurality of slave communication devices over the multiple frequency channels;

an abnormality determination unit determining, for each of the plurality of slave communication devices, an abnormality in wireless communication between the at least one master communication device and each of the plurality of slave communication devices based on strength of correlation between:

(a) an overall trend of the multiple communication characteristics across the multiple frequency channels obtained by the communication characteristics obtainer regarding wireless communication over the multiple frequency channels between the at least one master communication device and each of the plurality of slave communication devices; and (b) an overall trend of the multiple reference communication characteristics across the multiple frequency channels that are stored in the storage unit for each of the plurality of slave communication devices, the at least one master communication device are at least two master communication devices, each of the at least two master communication devices is capable of performing wireless communication with each of the plurality of slave communication devices over the multiple frequency channels, and the management device further comprises an abnormal position determination unit performing an abnormal position determining process to determine, based on a plurality of determination results of whether an abnormality occurs in wireless communication between each of the at least two master communication devices and each of the plurality of slave communication devices, whether an abnormality occurs in any one of (a) the at least two master communication devices, (b) the plurality of slave communication devices, and (c) communication propagation paths between the at least two master communication devices and the plurality of slave communication devices.

2. The communication system of claim 1, wherein when the abnormal position determination unit determines that at least one of the plurality of slave communication devices has an abnormality in wireless communication, the abnormality determination unit performs the abnormal position determining process.

3. The communication system of claim 2, wherein the communication characteristics obtainer is capable of obtaining first communication characteristics information and second communication characteristics information that is different from the first communication characteristics information, the abnormality determination unit determines, for each of the slave communication devices, whether an abnormality occurs in wireless communication between each of the at least two master communication devices and each of the plurality of slave communication devices using the first communication characteristics information, when the abnormality determination unit determines that at least one of the plurality of slave communication devices has an abnormality in wireless communication using the first communication characteristics information, the abnormality determination unit further determines, for each of the plurality of slave communication devices, whether an abnormality occurs in wireless communication between each of the at least two master communication devices and each of the plurality of slave communication devices using the second communication characteristics information, and when the abnormality determination unit determines that at least one of the plurality of slave communication devices has an abnormality in wireless communication using the second communication characteristics information, the abnormal position determination unit performs the abnormal position determining process.

4. The communication system of claim 3, wherein the first communication characteristics information is a received signal strength indicator indicative of a reception strength of wireless communication, and the second communication characteristics information is a packet error rate or a bit error rate in wireless communication between the at least two master communication devices and the plurality of slave communication devices.

5. The communication system of claim 1, wherein the abnormal position determination unit determines that one of the at least two master communication devices has an abnormality therein when the abnormality determination unit determines that (a) an abnormality occurs in all wireless communications between the one of the at least two master communication devices and the plurality of slave communication devices, and (b) an abnormality does not occur in at least one of wireless communications between an other of the at least two of the master communication devices and the plurality of slave communication devices.

6. The communication system of claim 1, wherein when one of the plurality of slave communication devices as determined to have an abnormality in wireless communication with one of the at least two master communication devices and one of the plurality of slave communication devices as determined to have an abnormality in wireless communication with an other of the at least two master communication devices are same, the abnormal position determination unit determines that the one of the plurality of slave communication devices has an abnormality therein.

7. The communication system of claim 1, wherein the abnormal position determination unit determines that an abnormality has occurred in the communication propagation paths between the at least two master communication devices and the plurality of slave communication devices when the abnormality determination unit determines that (a) an abnormality occurs in all wireless communications between one of the at least two master communication devices and the plurality of slave communication devices, and (b) an abnormality occurs in all wireless communications between an other of the at least two master communication devices and the plurality of slave communication devices.

8. The communication system of claim 1, wherein the communication characteristics obtainer is capable of obtaining first communication characteristics information and second communication characteristics information that is different from the first communication characteristics information, when an abnormal position cannot be identified due to inconsistency between a determination result of whether an abnormality occurs in wireless communications between one of the at least two master communication devices and the plurality of slave communication devices using the first communication characteristics information and a determination result of whether an abnormality occurs in wireless communications between an other of the at least two master communication devices and the plurality of slave communication devices using the first communication characteristics information, the abnormal position determination unit attempts to identify the abnormal position based on a plurality of determination results of whether an abnormality occurs in wireless communications between each of the at least two of master communication devices and each of the plurality of slave communication devices using the second communication characteristics information.

9. The communication system of claim 1, wherein the management device includes a microprocessor.

10. A communication system, comprising:

at least one master communication device;

a plurality of slave communication devices; and a management device, wherein the at least one master communication device and the plurality of slave communication devices are arranged at fixed positions, the at least one master communication device is capable of wirelessly communicating with each of the plurality of slave communication devices over multiple frequency channels, the at least one master communication device includes a communication characteristics obtainer obtaining, for each of the plurality of slave communication devices, multiple communication characteristics related to wireless communication over the multiple frequency channels while performing wireless communication with each of the plurality of slave communication devices, and the management device comprises:

a storage unit storing, for each of the plurality of slave communication devices, multiple reference communication characteristics related to wireless communication over the multiple frequency channels, the reference communication characteristics being characteristics that were obtained when the at least one master communication device communicated with each of the plurality of slave communication devices over the multiple frequency channels;

an abnormality determination unit determining, for each of the plurality of slave communication devices, an abnormality in wireless communication between the at least one master communication device and each of the plurality of slave communication devices based on strength of correlation between:

(a) an overall trend of the multiple communication characteristics across the multiple frequency channels obtained by the communication characteristics obtainer regarding wireless communication over the multiple frequency channels between the at least one master communication device and each of the plurality of slave communication devices; and (b) an overall trend of the multiple reference communication characteristics across the multiple frequency channels that are stored in the storage unit for each of the plurality of slave communication devices, the management device further comprises an update unit updating the reference communication characteristics stored, for each of the plurality of slave communication devices, in the storage unit.

11. The communication system of claim 10, wherein the update unit updates the reference communication characteristics stored in the storage unit using (a) reference communication characteristics obtained from an outside or (b) the multiple communication characteristics that were obtained by the communication characteristics obtainer when the at least one master communication device communicated with each of the plurality of slave communication devices over the multiple frequency channels.

12. The communication system of claim 10, wherein the management device includes a microprocessor.

13. A communication system comprising:

at least one master communication device;

a plurality of slave communication devices; and a management device, wherein the at least one master communication device and the plurality of slave communication devices are arranged at fixed positions, the at least one master communication device is capable of wirelessly communicating with each of the plurality of slave communication devices over multiple frequency channels, the at least one master communication device includes at least one first processor programmed to obtain, for each of the plurality of slave communication devices, multiple communication characteristics related to wireless communication over the multiple frequency channels while performing wireless communication with each of the plurality of slave communication devices, and the management device comprises:

a storage unit storing, for each of the plurality of slave communication devices, multiple reference communication characteristics related to wireless communication over the multiple frequency channels, the reference communication characteristics being characteristics that were obtained when the at least one master communication device communicated with each of the plurality of slave communication devices over the multiple frequency channels;

at least one second processor programmed to determine, for each of the plurality of slave communication devices, an abnormality in wireless communication between the at least one master communication device and each of the plurality of slave communication devices based on strength of correlation between:

(a) an overall trend of the multiple communication characteristics across the multiple frequency channels obtained by the at least one first processor regarding wireless communication over the multiple frequency channels between the at least one master communication device and each of the plurality of slave communication devices; and (b) an overall trend of the multiple reference communication characteristics across the multiple frequency channels that are stored in the storage unit for each of the plurality of slave communication devices, the at least one master communication device are at least two master communication devices, each of the at least two master communication devices is capable of performing wireless communication with each of the plurality of slave communication devices over the multiple frequency channels, and the management device further comprises an abnormal position determination unit performing an abnormal position determining process to determine, based on a plurality of determination results of whether an abnormality occurs in wireless communication between each of the at least two master communication devices and each of the plurality of slave communication devices, whether an abnormality occurs in any one of (a) the at least two master communication devices, (b) the plurality of slave communication devices, and (c) communication propagation paths between the at least two master communication devices and the plurality of slave communication devices.

14. The communication system of claim 13, wherein the management device includes a microprocessor.

15. A method for a communication system including:

at least one master communication device;

a plurality of slave communication devices; and a management device, wherein the at least one master communication device and the plurality of slave communication devices are arranged at fixed positions, the at least one master communication device is capable of wirelessly communicating with each of the plurality of slave communication devices over multiple frequency channels, the method comprising:

obtaining, for each of the plurality of slave communication devices, multiple communication characteristics related to wireless communication over the multiple frequency channels while performing wireless communication with each of the plurality of slave communication devices;

storing, for each of the plurality of slave communication devices, multiple reference communication characteristics related to wireless communication over the multiple frequency channels, the reference communication characteristics being characteristics that were obtained when the at least one master communication device communicated with each of the plurality of slave communication devices over the multiple frequency channels;

determining, for each of the plurality of slave communication devices, an abnormality in wireless communication between the at least one master communication device and each of the plurality of slave communication devices based on strength of correlation between:

(a) an overall trend of the multiple communication characteristics across the multiple frequency channels obtained by at least one first processor in the master communication device regarding wireless communication over the multiple frequency channels between the at least one master communication device and each of the plurality of slave communication devices; and (b) an overall trend of the multiple reference communication characteristics across the multiple frequency channels that are stored in a storage unit for each of the plurality of slave communication devices, the at least one master communication device are at least two master communication devices, each of the at least two master communication devices is capable of performing wireless communication with each of the plurality of slave communication devices over the multiple frequency channels, and the method further comprises performing an abnormal position determining process to determine, based on a plurality of determination results of whether an abnormality occurs in wireless communication between each of the at least two master communication devices and each of the plurality of slave communication devices, whether an abnormality occurs in any one of (a) the at least two master communication devices, (b) the plurality of slave communication devices, and (c) communication propagation paths between the at least two master communication devices and the plurality of slave communication devices.

16. The method of claim 15, wherein the management device includes a microprocessor.

* * * * *